US006981513B2

(12) United States Patent
Krywitsky

(10) Patent No.: US 6,981,513 B2
(45) **Date of Patent: *Jan. 3, 2006**

(54) FLUID FLOW MANAGEMENT SYSTEM

(75) Inventor: Lee A. Krywitsky, Calgary (CA)

(73) Assignee: Hiltap Fittings, LTD, Salt Lake City, UT (US)

( * ) Notice: Subject to any disclaimer, the term of this patent is extended or adjusted under 35 U.S.C. 154(b) by 263 days.

This patent is subject to a terminal disclaimer.

(21) Appl. No.: 10/140,276

(22) Filed: May 7, 2002

(65) Prior Publication Data

US 2002/0170596 A1 Nov. 21, 2002

Related U.S. Application Data

(63) Continuation-in-part of application No. 09/628,075, filed on Jul. 28, 2000, now Pat. No. 6,672,327.

(51) Int. Cl.
*F16K 17/36* (2006.01)
*F16L 37/36* (2006.01)
*G01M 3/08* (2006.01)

(52) U.S. Cl. ............................ 137/68.14; 137/614.06; 73/46

(58) Field of Classification Search ............ 137/68.14, 137/312, 614.06; 73/46
See application file for complete search history.

(56) References Cited

U.S. PATENT DOCUMENTS

| | | | | |
|---|---|---|---|---|
| 2,333,496 A | | 11/1943 | Townhill et al. | |
| 2,340,965 A | | 2/1944 | Kiesel | |
| 2,571,236 A | * | 10/1951 | Hamilton, Jr. | 73/46 |
| 2,707,390 A | * | 5/1955 | Beretish | 73/46 |
| 3,454,024 A | | 7/1969 | McCullough | |
| 3,542,047 A | | 11/1970 | Nelson | |
| 3,664,634 A | | 5/1972 | Guertin et al. | |
| 4,010,633 A | * | 3/1977 | Hasha | 73/46 |
| 4,019,371 A | * | 4/1977 | Chaplin et al. | 73/46 |
| 4,271,865 A | * | 6/1981 | Galloway et al. | 137/614.06 |
| 4,510,969 A | | 4/1985 | Rodth | |
| 4,567,924 A | | 2/1986 | Brown | |
| 4,614,201 A | | 9/1986 | King et al. | |
| 4,625,746 A | | 12/1986 | Calvin et al. | |
| 4,646,773 A | | 3/1987 | Klop et al. | |
| 4,827,960 A | | 5/1989 | Nitzberg et al. | |
| 4,901,751 A | * | 2/1990 | Story et al. | 137/312 |
| 4,926,680 A | * | 5/1990 | Hasha et al. | 73/46 |
| 5,170,659 A | * | 12/1992 | Kemp | 73/46 |
| 5,209,105 A | * | 5/1993 | Hasha et al. | 73/46 |

(Continued)

OTHER PUBLICATIONS

OEM Mass Flowmeters, TSI Incorporated, 1998.

(Continued)

*Primary Examiner*—John Rivell
(74) *Attorney, Agent, or Firm*—Workman-Nydegger

(57) ABSTRACT

A fluid flow management system that includes a feedback system in communication with a fluid system component having discrete elements that, when joined together, define a joint and chamber. The fluid flow management system further includes a feedback fluid source in fluid communication with the chamber and with a pressure transducer. The feedback fluid source, transducer, and chamber collectively define a substantially closed system so that fluid introduced by the feedback fluid source eventually reaches static equilibrium. Separation of, or relative movement between, the discrete elements of the fluid system components permits fluid to escape the chamber, thereby causing a pressure change that is detected by the pressure transducer. The pressure transducer then generates and transmits a signal indicating a loss of joint integrity. The signal may be used to aid in the implementation of various actions concerning the system wherein the fluid system component is employed.

45 Claims, 16 Drawing Sheets

U.S. PATENT DOCUMENTS

| | | | | | |
|---|---|---|---|---|---|
| 5,297,574 | A | | 3/1994 | Healy | |
| 5,316,033 | A | | 5/1994 | Schumacher et al. | |
| 5,404,909 | A | | 4/1995 | Hanson | |
| 5,529,085 | A | | 6/1996 | Richards et al. | |
| 5,699,822 | A | | 12/1997 | Bodhaine | |
| 5,826,610 | A | | 10/1998 | Bodhaine | |
| 5,934,319 | A | | 8/1999 | Schumacher | |
| 6,000,278 | A | * | 12/1999 | Hystad | 73/46 |
| 6,082,392 | A | * | 7/2000 | Watkins, Jr. | 137/312 |
| 6,142,194 | A | | 11/2000 | McClaran | |
| 6,155,294 | A | | 12/2000 | Cornford et al. | |

OTHER PUBLICATIONS

SIMA FC2 Induction-based flow meter, www.simaservis.cz, publication date unknown.

* cited by examiner

FLUID FLOW MANAGEMENT SYSTEM

CROSS-REFERENCE TO RELATED APPLICATIONS

This application is a continuation-in-part of U.S. patent application Ser. No. 09/628,075, entitled DRY BREAK VALVE ASSEMBLY, filed Jul. 28, 2000, now U.S. Pat. No. 6,672,327, and incorporated herein in its entirety by this reference.

BACKGROUND

1. Technological Field

The present invention relates generally to fluid systems. More particularly, embodiments of the present invention relate to a fluid flow management system that includes a dry break valve assembly which automatically terminates flow in the event constituent portions of the dry break valve assembly are separated for any reason. The fluid flow management system also includes a feedback system that, among other things, facilitates both the monitoring of the integrity of one or more joints of the dry break valve assembly, as well as the implementation of various actions corresponding to the data obtained as a result of such monitoring.

2. Related Technology

In recent years, environmental concerns have been receiving significantly more attention, and various governmental agencies have responded by implementing stringent regulations to reduce or prevent pollution. Many of these regulations and concerns are directed towards those industries that transport fluids. For example, it is very difficult to transport a fluid without spilling or leaking some of the fluid into the environment. Thus, some environmental regulations require that minimal leaking occur during handling, processing, or transportation of the fluid.

These environmental concerns become especially clear when considering the magnitude of the industries that handle hazardous fluids that, if allowed to escape even in relatively small quantities, can cause significant damage. There is a concern, therefore, to protect both the public and the environment from these types of fluids. While some fluids that are transported, such as water and milk, may not pollute the environment when they are leaked or spilled, the loss of fluid into the environment is nevertheless viewed as a general waste of resources. More generally, the loss of fluid into the environment is not desirable even if the fluid does not contribute to pollution.

Within the transportation industry, a variety of different devices are used to transport a fluid from a source to a destination. These devices often use valve assemblies and conduits of various types to both connect the source to the destination as well as to manage fluid flow through the conduit. Typically, the conduit is pressurized to direct fluid toward the desired destination. With each transfer of fluid, there is a risk that leakage will occur due to human error, equipment malfunctions, or the like.

A common source of fluid leaks and fluid spills are the valves and other components and devices employed in fluid systems. By way of example, some valves may have leaks that permit flow through the valve even when the valve is secured in the closed position. In other instances, one or more joints defined by constituent elements of the valve, such as in the case of valves designed to be taken down in two or more pieces, and/or one or more joints at least partially defined by the valve, such as a valve-to-flange connection, may be defective, resulting in leakage of some or all of the system fluid. Unfortunately, problems such as these often do not manifest themselves until after flow has been established through the valve, component, or device.

Thus, in many instances, the system operator is limited in terms of the affirmative steps that can be taken to prevent a spill that may result from one or more defective joints, and oftentimes can only correct the spill when it occurs. This is true in the case of joints that are defectively assembled, or are otherwise defective upon assembly, as well as in the case of joints that become defective over a period of time due to operating, or other, conditions.

Other problems exist as well. For example, various types of valves have been designed to stop, or "check," fluid flow through the valve when the valve is taken down into two or more constituent parts or assemblies. One known device for checking fluid flow is a ball check valve. A ball check valve is essentially a ball which rests against a ball seat to form a valve. An operator may use the ball check valve to initiate or terminate the fluid flow. Despite the check feature of the ball check valve, a problem exists in the integrity of the fluid transfer system when the valve or conduit undergoes stress.

When the conduit and the valve are subjected to forces such as stretching, pulling, twisting, and the like, the fluid being transferred through the conduit and the valve may leak or spill into the environment. More particularly, the conduit, rather than the ball check valve, is likely to rupture or otherwise malfunction in the presence of these forces. Thus, while the ball check valve is appropriate for checking fluid flow, it does not prevent spillage or leakage when subjected to external stress. Because the conduit is likely to rupture, or otherwise malfunction, in these types of situations, the spillage or leakage of fluid into the environment can be significant because the fluid flow can no longer be checked.

For example, when a fuel transport vehicle is delivering liquid through a hose into a fuel tank, one end of the hose is attached to the fuel transport vehicle, and the other end of the hose is attached to a fuel tank. A valve such as a ball check valve may be disposed at the vehicle end of the hose such that fluid communication through the hose may be established or checked.

In the event the fuel transport vehicle drives away with the hose still connected, the connection will likely break or rupture. Because the hose is typically the weakest part of the connection, the break usually occurs somewhere in the hose and fluid escapes into the environment. In this example, the ball check valve typically does not disassemble because it is much stronger than the hose. Even if the ball check valve were to break instead of the hose, fluid would still leak from the system. Such problems are particularly acute in the context of automated environments and operations where few, or no, humans may be present, and a leak may go unnoticed for a relatively long period of time.

Accordingly, what is needed is a fluid flow management system having features directed to addressing the foregoing exemplary considerations, as well as other considerations not disclosed herein. An exemplary fluid flow management system includes a dry break valve assembly that automatically disassembles when excessive force is applied to the system to which the dry break valve assembly is connected. Moreover, the dry break valve assembly should be constructed to automatically terminate flow at substantially the same time as such disassembly occurs. Finally, the fluid flow management system should allow an operator to monitor the integrity of one or more of the dry break valve assembly joints, and to implement appropriate actions concerning the system in conjunction with which the fluid flow management system is employed, in the event such integrity is compromised.

BRIEF SUMMARY OF AN EXEMPLARY EMBODIMENT OF THE INVENTION

In general, embodiments of the invention are concerned with a fluid flow management system that, among other things, facilitates control of fluids before, during, and after transfer.

In one exemplary embodiment of the invention, a fluid flow management system is provided that includes a dry break valve assembly having first and second housing portions removably joined to each other and configured so that, when joined together, they collectively define a chamber. A flow control assembly is disposed in each of the first and second housing portions and each of the flow control assemblies are operably connected with an actuating mechanism which permits the simultaneous opening, and closing, of the flow control assemblies so as to permit, or prevent, respectively, flow through the dry break valve assembly. The dry break valve assembly is also configured so that upon separation of the first and second housing portions, the flow control assemblies each automatically assume a "closed" configuration, thereby preventing further fluid flow.

Additionally, the fluid flow management system includes a feedback system that among other things, facilitates both the monitoring of the integrity of one or more joints of the dry break valve assembly, as well as the implementation of various actions corresponding to the data obtained as a result of such monitoring. One exemplary embodiment of the feedback system includes a feedback system fluid source configured for communication with the chamber by way of a sensor line, as well as a pressure transducer in fluid communication with the sensor line, and a processor in electronic communication with the pressure transducer.

In this exemplary embodiment, the feedback system fluid source introduces fluid into the chamber and the pressure transducer until the chamber and pressure transducer are in static equilibrium with the feedback system fluid source. Because the chamber is formed proximate to the joint defined by the first and second housing portions, a relative movement between, or separation of, the first and second housing portions, will permit at least some of the pressurized feedback system fluid to escape.

In operation, a separation of the first and second housing portions causes the flow control assemblies to automatically assume the "closed" position, thereby preventing further fluid flow through the dry break valve assembly. At substantially the same time, separation of the first and second housing portions causes fluid to escape from the chamber, thereby upsetting the static equilibrium of the pressurized feedback system fluid. This disruption of the static equilibrium results in a pressure change that causes the pressure transducer to generate and transmit a corresponding signal which may then be employed to cause various actions to be taken respecting the system in conjunction with which the fluid flow management system is employed. In one exemplary embodiment, a processor in communication with the pressure transducer causes a visual and audible warning signal to be generated, indicating that the first and second housing portions have separated.

These and other, aspects of embodiments of the present invention will become more fully apparent from the following description and appended claims.

BRIEF DESCRIPTION OF THE DRAWINGS

A more particular description of various aspects of the embodiments of the invention illustrated in the appended drawings will now be rendered. Understanding that such drawings depict only exemplary embodiments of the invention, and are not therefore to be considered limiting of the scope of the invention in any way, various features of such exemplary embodiments will be described and explained with additional specificity and detail through the use of the accompanying drawings in which.

DETAILED DESCRIPTION OF VARIOUS EMBODIMENTS OF THE INVENTION

Reference will now be made to figures wherein like structures will be provided with like reference designations. It is to be understood that the drawings are diagrammatic and schematic representations of various embodiments of the invention, and are not to be construed as limiting the present invention, nor are the drawings necessarily drawn to scale.

Figure 1:
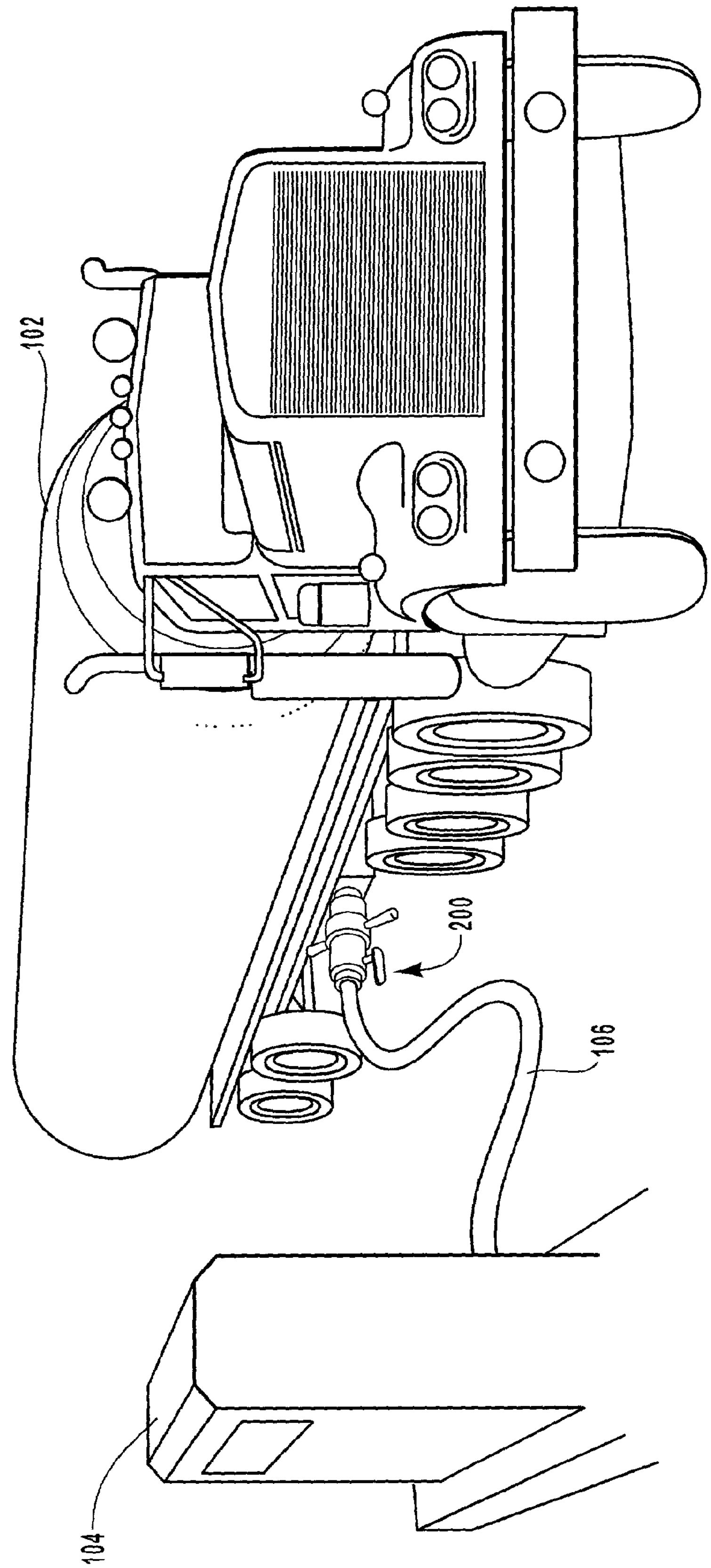
FIG. 1 depicts an exemplary operating environment for at least some embodiments of the present invention.

With reference first to FIG. 1, one embodiment of a fluid transfer system is indicated generally at 100. Note that, as contemplated herein, "fluid" includes liquids, gases, liquid-gas combinations, slurries, liquid-solid combinations, gas-solid combinations, and liquid-solid-gas combinations. In the exemplary embodiment depicted in FIG. 1, fluid transfer system 100 includes a fluid source 102 configured for fluid communication with a dry break valve assembly 200. Dry break valve assembly 200, in turn, is configured for selective fluid communication with a fluid destination 104, by way of a fluid conduit 106.

As discussed elsewhere herein, it will be appreciated that dry break valve assembly 200 may be located, in its entirety, at fluid source 102, or alternatively at fluid destination 104. In one embodiment, discussed in detail below, dry break valve assembly 200 comprises at least two discrete portions, one of which may be located at fluid source 102, and the other of which may be located at fluid conduit 106, or vice versa in a fluid loading situation.

As contemplated herein, the term "conduit" is meant to include any structure or device adapted to facilitate transportation of a fluid, wherein such structures and devices include, but are not limited to, pipes, hoses, tubes, or the like. Fluid conduit 106 may be constructed of a variety of materials, or combinations thereof, including, but not limited to, metal, plastic, rubber, and the like.

With continuing reference to FIG. 1, the fluid source 102 is illustrated as a fluid transport vehicle, and the fluid destination 104 is illustrated as an underground tank. However it will be appreciated that fluid source 102 and/or fluid destination 104, may comprise any of a variety of different static or mobile structures and vehicles. Such structures and vehicles include, but are not limited to, air, water, or land vehicles, such as, but not limited to, trucks, boats, automobiles, motorcycles, ships, railcars, aircraft, and the like, as well as structures such as tanks, reservoirs, and the like.

In operation, a pressure differential is established between fluid source 102 and fluid destination 104 so as to cause flow of the fluid through fluid conduit 106 in the desired direction. It will be appreciated that the pressure differential may be established in such a way as to cause flow to proceed in the opposite direction as well. The pressure differential may result from the force of gravity, or may alternatively be established by various types of equipment and devices including, but not limited to, pumps and the like.

In general, dry break valve assembly 200 facilitates management and control of fluid flow between fluid source 102 and fluid destination 104. In particular, valve assembly 200 allows for selective establishment and termination of fluid communication between fluid source 102 and fluid destination 104. Additionally, dry break valve assembly 200 facilitates releasable engagement of two different fluid system components, for example, fluid conduit 106 and fluid source 102. Finally, dry break valve assembly 200 includes various features which substantially prevent fluid leakage should the discrete portions of dry break valve assembly 200 be separated for any reason.

Figure 2:
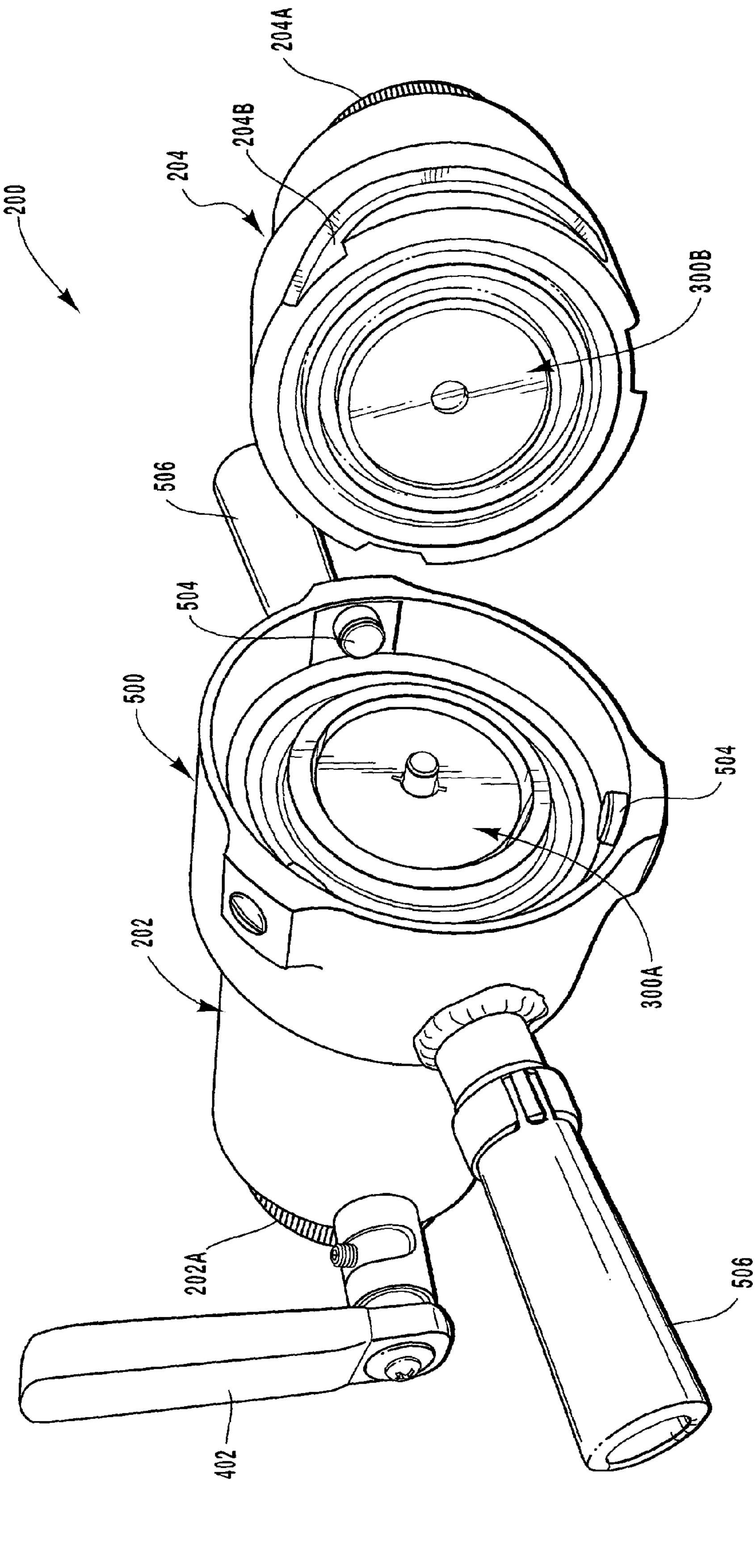
FIG. 2 is a perspective view of an embodiment of the dry break valve assembly which includes a source housing and a destination housing that can be releasably connected to each other using a sleeve.

With reference now to FIG. 2, dry break valve assembly 200 includes a first housing portion 202 and second housing portion 204. As used herein, the portion of the valve assembly closest to the fluid source is referred to as the source housing while the other housing portion is referred to as the destination portion. Either portion of the dry break valve assembly can be the source housing or the destination housing. Coupling 500 serves to removably secure first housing portion 202 and second housing portion 204 in a substantially leakproof engagement.

Substantially disposed within first housing portion 202 and second housing portion 204, respectively, are flow control assemblies 300A and 300B. In general, flow control assemblies 300A and 300B facilitate management of fluid flow through conduits, or the like, connected to first housing portion 202 and second housing portion 204, respectively. Also disposed within first housing portion 202, and discussed in greater detail below, is an actuating mechanism (not shown in FIG. 2), which serves to manipulate the position of flow control assemblies 300A and 300B in response to input provided by way of actuating lever 402. Thus, the position of the flow control assemblies 300A and 300B may vary between fully open and fully closed.

First housing portion 202 includes a conduit connector 202A. Conduit connector 202A is configured to attach to fluid conduit 106 (shown in FIG. 1), wherein such attachment may be accomplished in a variety of ways including, but not limited to, welding, brazing, soldering, and the like. Alternatively, conduit connector 202A may comprise a compression fitting, threaded fitting, or the like for attaching to fluid conduit 106.

In similar fashion, second housing portion 204 has a conduit connector 204A. Conduit connector 204A is configured to attach to fluid conduit 106, wherein such attachment may be accomplished in a variety of ways including, but not limited to, welding, brazing, soldering, and the like. Alternatively, conduit connector 204A may comprise a compression fitting, threaded fitting, or the like for attaching to fluid conduit 106. It will be appreciated that conduit connector 202A and/or conduit connector 204A may, alternatively, be connected directly to fluid source 102 or fluid destination 106.

Figure 3:
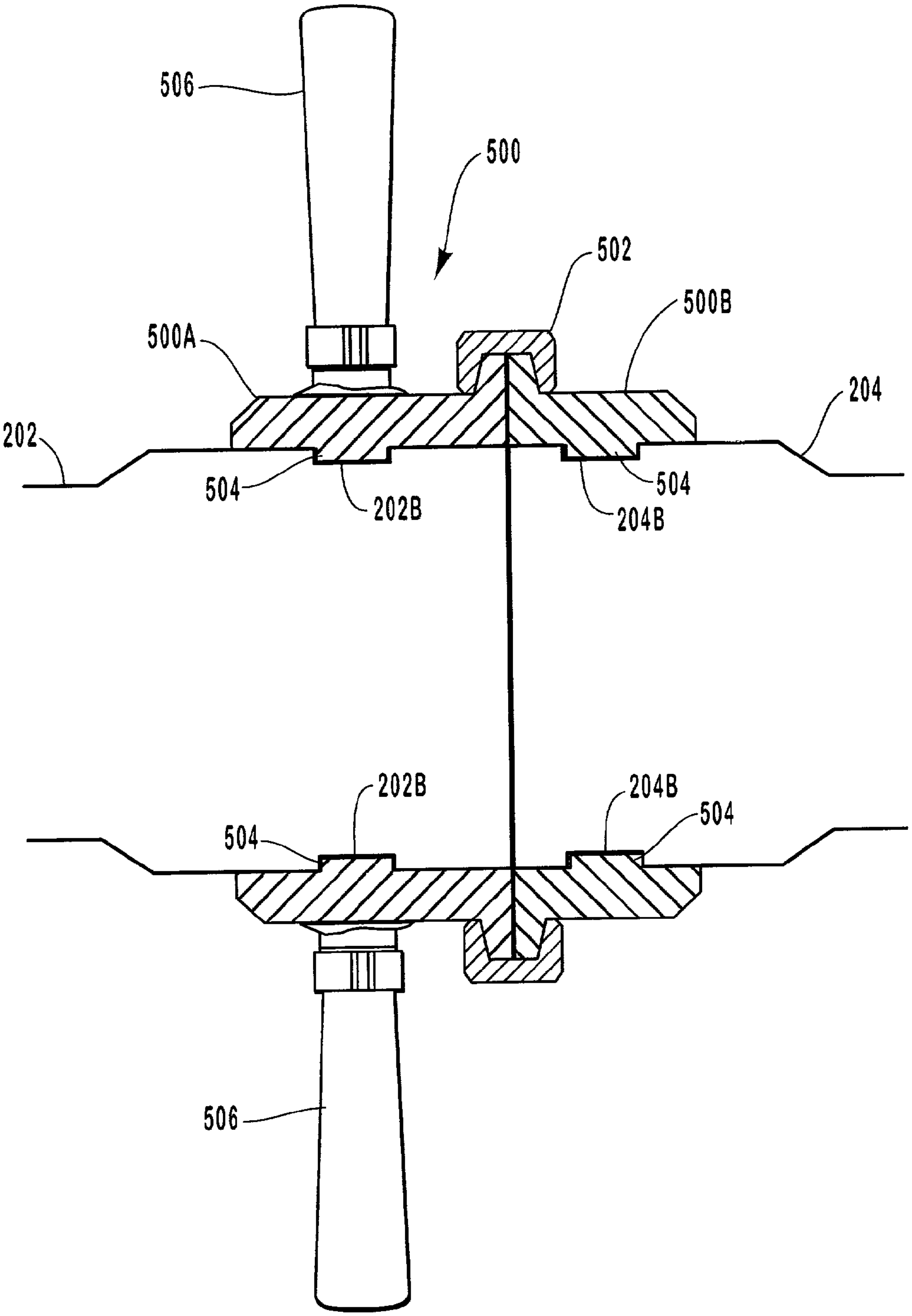
FIG. 3 depicts an embodiment of a sleeve which releasably seals and connects a source housing with a destination housing.

Directing attention now to FIG. 3, and with continuing attention to FIG. 2, additional details regarding coupling 500 are provided. As indicated in FIG. 3, coupling 500 includes a first engaging portion 500A and a second engaging portion 500B joined together by collar 502 which serves to substantially prevent relative motion between first engaging portion 500A and a second engaging portion 500B. Preferably, first engaging portion 500A and a second engaging portion 500B each comprise an outward extending annular ridge or the like which, when brought into a confronting relation with each other, are collectively configured to mate with corresponding structure defined by collar 502, as suggested in FIG. 3. It will be appreciated however, that coupling 500 and collar 502, either individually or collectively, may be configured in any number of alternate ways that would facilitate achievement of the functionality disclosed herein. In addition the connecting portions of the engaging portions 500A and 500B may be ridged to ensure that relative motion between the portions does not occur.

In one embodiment, first engaging portion 500A and a second engaging portion 500B each further includes a plurality of pins 504 that mate with corresponding grooves 202B and 204B, defined by first housing portion 202 and second housing portion 204, respectively. Thus, a rotary motion imparted to coupling 500 by way of handles 506 releasably joins first engaging portion 500A and a second engaging portion 500B to first housing portion 202 and second housing portion 204, respectively, by causing pins 504 to travel to the respective ends of grooves 202B and 204B. Preferably, grooves 202B and 204B are of such a length that a rotary motion of about 90 degrees is adequate to releasably couple first housing portion 202 to second housing portion 204. It will be appreciated that a rotary motion of about 120 degrees in the opposite direction will be effective to disengage coupling 500 and thus release first housing portion 202 from second housing portion 204.

It will be appreciated that the arrangement of coupling 500 with respect to first housing portion 202 and second housing portion 204 may be varied in a number of ways. For example, in one embodiment, first engaging portion 500A is integral with first housing portion 202, so that only second engaging portion 500B comprises pins 504. Correspondingly, only grooves 204B are present and grooves 202B are not required. In this embodiment, a rotation, preferably about 120 degrees, imparted to coupling 500 by way of handles 506 causes rotating pins 504, or bearings in another embodiment, to travel the length of grooves 204B so that coupling 500 thereby releasably joins first housing portion 202 to second housing portion 204.

Yet another embodiment employs essentially a reverse configuration of that just discussed. In particular, in this embodiment, second engaging portion 500B is integral with second housing portion 204, and only first engaging portion 500A includes pins 504. Correspondingly, only grooves 202B are present and grooves 204B are not required. In this embodiment, a rotation, preferably about 90 degrees, imparted to coupling 500 by way of handles 506 causes pins 504 to travel the length of grooves 202B so that coupling 500 thereby releasably joins first housing portion 202 to second housing portion 204.

Finally, it will be appreciated that other types of structure and devices may be usefully employed to achieve the functionality collectively provided by pins 504 and grooves 202B and 204B. Accordingly, other structures and devices that provide such functionality are contemplated as being within the scope of the present invention, wherein such other structures and devices include, but are not limited to, threaded connections, spring-biased connections, and the like.

Figure 4:
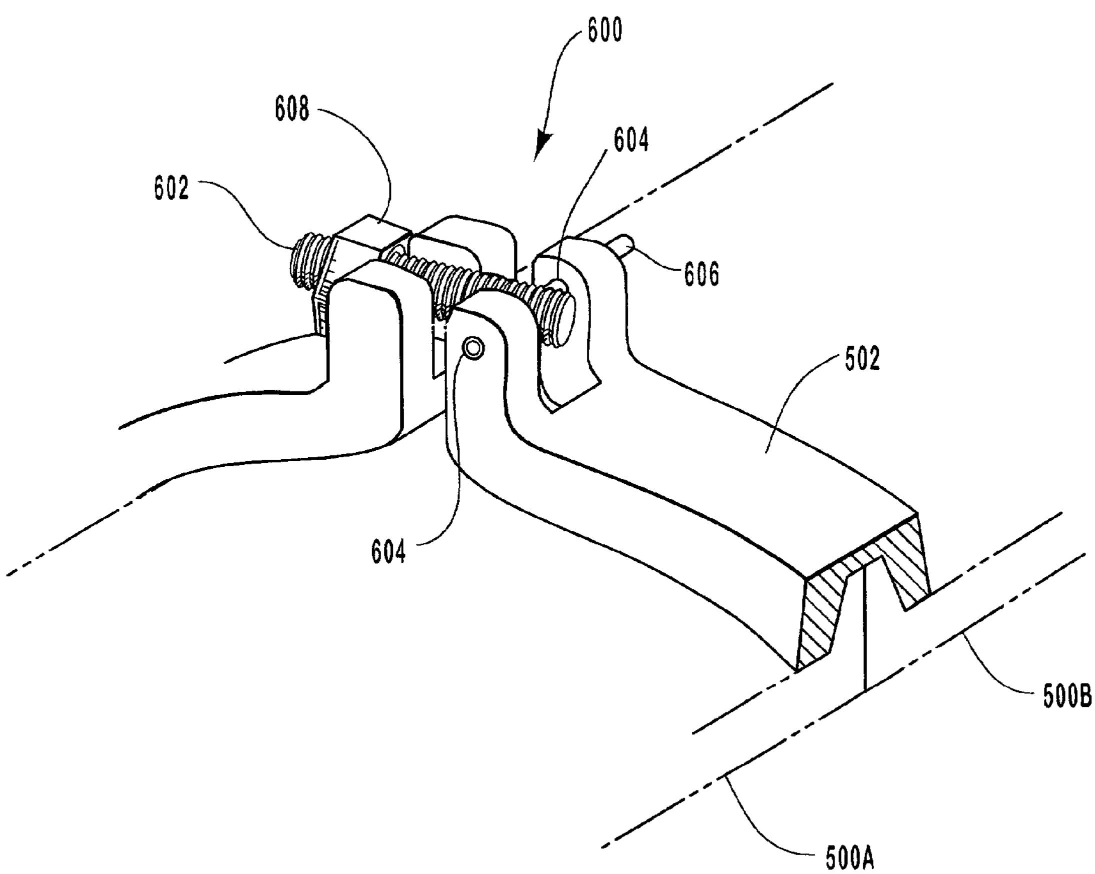
FIG. 4 is a perspective view indicating various details of a breakable link assembly that is an integral portion of a collar.

Directing attention now to FIG. 4, and with continuing attention to FIG. 3, additional details regarding collar 502 of coupling 500 are provided. In particular, collar 502 further includes a breakable link assembly 600. Generally, breakable link assembly 600 serves two primary purposes. First, breakable link assembly 600 serves to retain collar 502 securely in place about first engaging portion 500A and second engaging portion 500B of collar 502. Further, breakable link assembly 600 includes a sacrificial element that is designed to break, thereby allowing first engaging portion 500A and second engaging portion 500B to separate from each other, when a force, or forces, of predetermined magnitude are applied to particular elements of fluid transfer system 100, such as to valve assembly 200, or to fluid conduit 106.

In effect, when the sacrificial element breaks, then the coupling 500 is no longer capable of joining the first and second housings of the valve assembly and the valve assembly disassembles into two separate components. As previously described, fluid flow from each separate housing may be checked and when the valve assembly separates in this manner, fluid flow is checked and fluid spillage or leakage is thereby minimized.

As suggested in FIG. 4, collar 502 is essentially C-shaped, having an opening between its two ends. Breakable link assembly 600 is disposed across the opening thus defined and includes a threaded member 602, such as a bolt or the like, defining a bore (not shown) near one end. Preferably, the bore thus defined is substantially perpendicular to the longitudinal axis of threaded member 602. A shear pin 604 is slidably disposed in the bore and the opposing ends of shear pin 604 are received in collar 502 as indicated. Preferably, shear pin 604 is prevented from exiting the bore by way of cotter pins 606, or the like, disposed at either end of shear pin 604. It will be appreciated that shear pin 604 may alternatively be glued, welded, brazed, or otherwise bonded to collar 502 so as to prevent it from exiting the bore in threaded member 602.

Breakable link assembly 600 further includes a nut 608, or the like, engaged for advancement along threaded member 602. In operation, nut 608 is rotated so as to advance along threaded member 602 and thus draw the opposing ends of collar 502 securely together.

The operation of breakable link assembly 600 proceeds generally as follows. In the event a force, or forces, of predetermined magnitude in either a tensile or axial load are applied to valve assembly 200 and/or to fluid conduit 106, shear pin 604 will fracture and the valve assembly will disassemble. It will be appreciated that the materials and/or geometry of shear pin 604 may desirably be varied to adjust the point at which fracture will occur. It will further be appreciated that sacrificial elements other than shear pin 604 may usefully be employed. In general, any sacrificial element and/or breakable link assembly that provides the functionality, disclosed herein, of shear pin 604 and/or breakable link assembly 600 is contemplated as being within the scope of the present invention.

Upon fracture of shear pin 604, threaded member separates from collar 502, thus permitting the ends of collar 502 to move apart and thereby allow separation of first housing portion 202 and second housing portion 204. The functionality provided by breakable link assembly 600 thus ensures that in the event a predetermined level of force is applied to dry break valve assembly 200, or to components to which it is connected, dry break valve assembly 200 will break dry, and thus substantially prevent any material leakage of fluid. Further, breakable link assembly 600 substantially ensures that in the event such forces are applied, no material damage occurs to the components of fluid transfer system 100 (see FIG. 1). Thus, in addition to minimizing the fluid loss that would otherwise occur, the conduit 106 is preserved and damage is not done to the fluid source or the fluid destination.

Note that a variety of means may be profitably employed to perform the functions enumerated herein, of sealingly engaging first housing 204 with second housing 206 using coupler 500. Coupler 500 is an example of means for sealingly engaging first housing portion 202 and second housing portion 204. Accordingly, the structure disclosed herein simply represents one embodiment of structure capable of performing this function. It should be understood that this structure is presented solely by way of example and should not be construed as limiting the scope of the present invention in any way.

The valve assembly 200 and its various parts may be made of a range of materials depending on the type of fluid being transferred. Preferably, a material is chosen that can withstand corrosion and high temperature thermal cycling, such as carbon steel or stainless steel. Generally, valve assembly 200 may be constructed from Austenitic steel.

Figure 5:
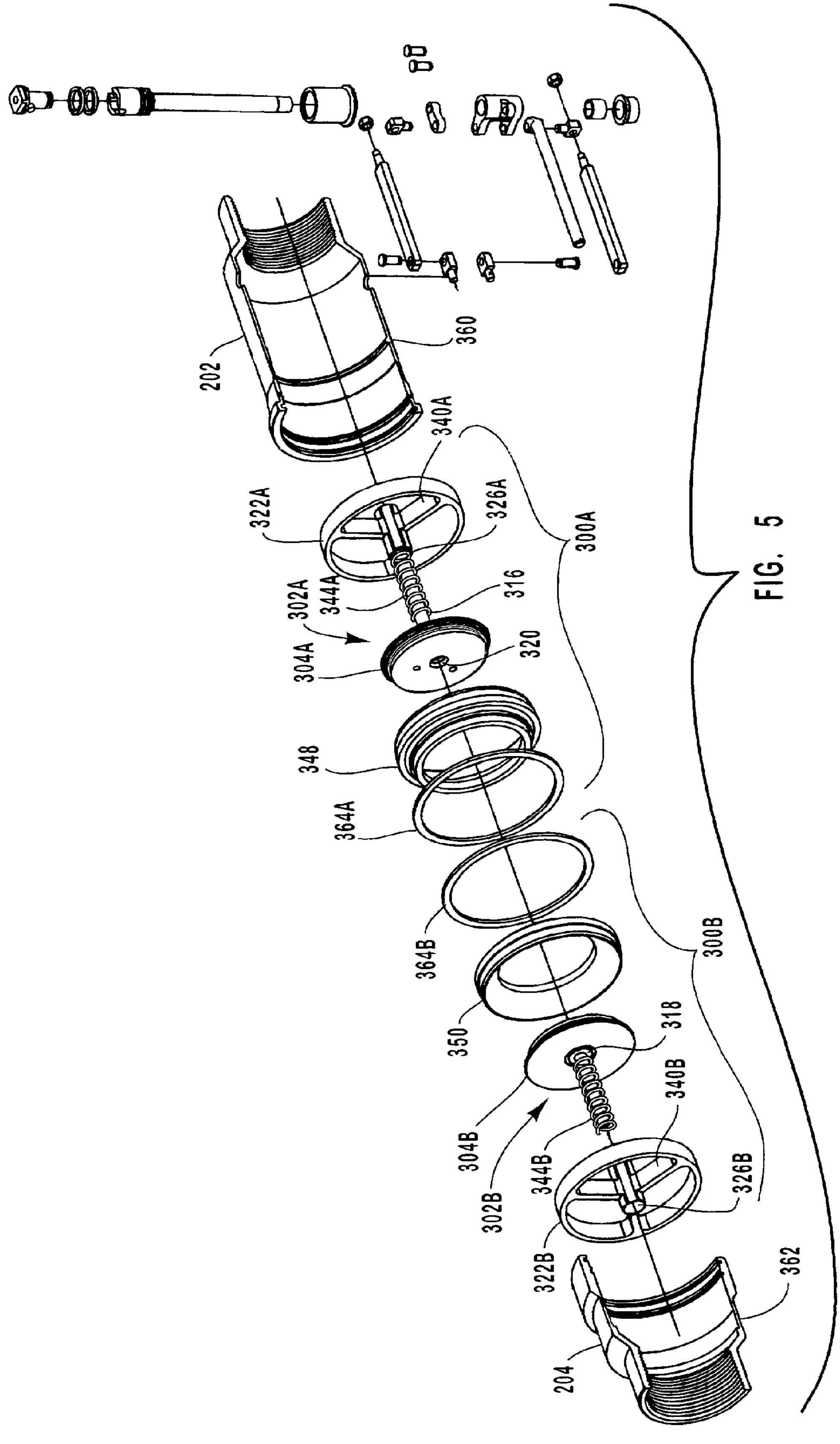
FIG. 5 is a perspective cutaway view of an embodiment of the present invention, illustrating various features of an actuating mechanism.

FIG. 5 shows an exploded perspective view of various features of the flow control assemblies of valve assembly 200. The following description of the housing configuration and flow control assemblies is by illustration only and not by way of limitation. Generally, flow control assembly 300A may comprise a flow control member 302A, a guide 322A, a resilient member 344A, a fitting member 348, and a snap ring 364A. Similarly, flow control assembly 300B may comprise a flow control member 302B, a guide 322B, a resilient member 344B, a sealing member 350, and a snap ring 364B.

Flow control assemblies 300A and 300B have a flow control member 302A and 302B, respectively. As shown in FIG. 3, flow control members 302A and 302B have a round disc-like valve gate 304A and 304B, respectively. Valve gate 304A contains a bore 320 substantially in the center of the valve gate so as to allow a substantially cylindrical piece to pass through the bore. It will be understood that bore 320 may be any geometrical shape (e.g., square, rectangular, polygonal, etc.) that will allow passage of a corresponding geometrical-shaped piece to pass through the bore.

Attached to valve gate 304A is a hollow driver shaft 316. Driver shaft 316 is placed in transverse relation to valve gate 304B. Preferably, driver shaft 316 is substantially concentric with bore 320 and contains substantially the same geometric shape as bore 320. Attached to valve gate 304B is a member 318, which may be solid or hollow. Driver shaft 316 and member 318 may be attached to valve gate 304A and 304B by any means known in the art, such as, but not limited to, welding, adhesive bonding, or may be formed integrally with valve gates 304A and 304B.

FIG. 5 further illustrates guides 322A and 322B. Guides 322A and 322B essentially add structural support to flow control assemblies 300A and 300B. Guides 322A and 322B contain bores 326A and 326B whose inner diameters correspond respectively with the outer diameters of driver shaft 316 and member 318. In practice, driver shaft 316 slidably passes through bore 326A, and, similarly, member 318 slidably passes through bore 326B. Preferably, guides 322A and 322B are essentially hollow except for three support bars generally designated as 340A and 340B. The hollow structure allows for structural members to pass through guides 322A and 322B and to be movably connected to valve gates 304A and 304B, which will be discussed in further detail later in this specification. However, it will be appreciated that guides 322A and 322B may be constructed having a partially solid configuration as long as the requisite area is present to allow for movement of parts.

FIG. 5 shows resilient member 344A and 344B which are placed onto driver shaft 316 and solid member 318, respectively. Resilient members 344A and 344B are shown in FIG. 5 to be springs. However, one skilled in the art will understand that resilient members 344A and 344B may be any structure which maintains a bias such as, but not limited to, a rubber material, an elastic material, polished metal, and the like.

FIG. 5 further depicts fitting member 348 and corresponding sealing member 350. The configuration of fitting member 348 and sealing member 350 will be discussed in more detail later in this specification. However, in general terms, fitting member 348 is tapered on one side to provide a valve seat for valve gate 302A. Similarly, sealing member 350 is tapered on one side to provide a valve seat for valve gate 302B. Preferably, valve gates 302A and 302B have corresponding tapers to allow for better sealing engagement.

As shown in FIG. 2, first housing portion 202 and second housing portion 204 are configured to allow for placement of flow control assemblies 300A and 300B to be disposed substantially within each housing. FIG. 5 shows ridge 360 placed on the interior surface of first housing portion 202. Ridge 360 acts as structural support for flow control assembly 300A. During assembly, guide 322A rests on ridge 360. Resilient member 344A is slid onto driver shaft 316, after which flow control member 302A is placed into first housing portion 202 with driver shaft 316 passing through bore 326A. Finally, fitting member 348 is placed into first housing portion 202 to complete the flow control assembly 300A. It will be understood from the drawings and foregoing discussion that flow control assembly 300B may be assembled in a manner similar to that for flow control assembly 300A.

It will be noted from FIG. 5, that second housing portion 204 has a ledge 362 to provide a similar structural function as ridge 360. It will be appreciated that first housing portion 202 and second housing portion 204 may have structural ridges and grooves on the interior surface of the housing to provide for better structural engagement of corresponding parts of flow control assemblies 300A and 300B.

In one embodiment, snap rings 364A and 364B are provided for a better sealing engagement when flow control assembly 300A and 300B are assembled and for easier disassembly during maintenance of the valve assembly. In another embodiment, valve gate 304A and 304B may have an O-ring placed along the taper to provide for better sealing engagement.

Figure 6:
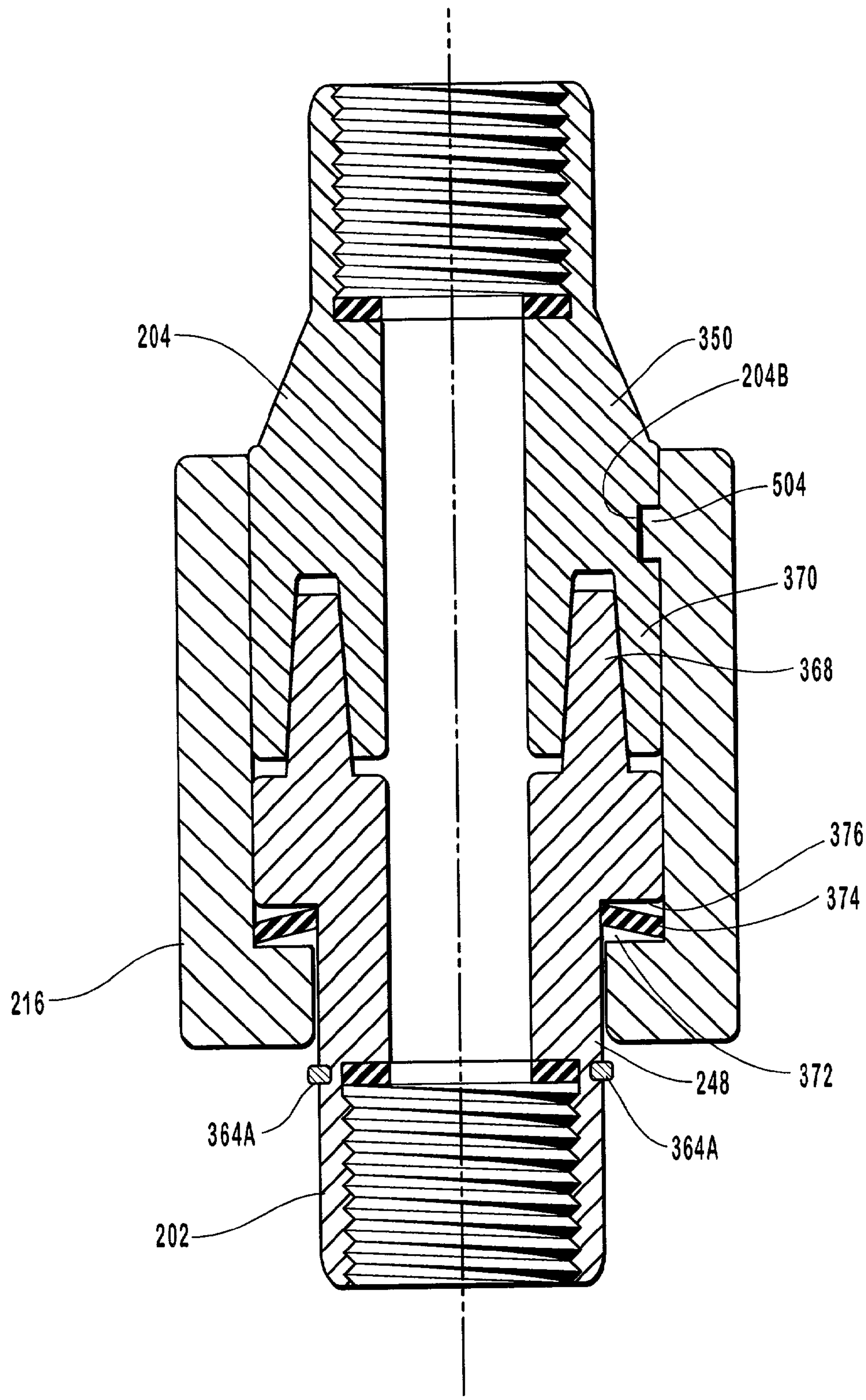
FIG. 6 is a cross section view of an exemplary sealing interface within an embodiment of a dry break valve assembly.

FIG. 6 is a cross-section of an exemplary embodiment of the dry break valve assembly, illustrating the sealing engagement between first housing portion 202 and second housing portion 204. First housing portion 202 and second housing portion 204 are joined in sealing engagement preferably in at least two ways—at their outer rims and between fitting member 348 and sealing member 350.

FIG. 6 shows the outer rims of first housing portion 202 and second housing portion 204 in sealing engagement. During assembly of dry break valve assembly 200, coupler 500 acts to join the outer rims of first housing portion 202 and second housing portion 204 to join them in sealing engagement. Tightening of the coupler 500 further acts to seal valve assembly 200. Preferably, L-shaped grooves 204B are configured such that sealing engagement occurs when pins 504 are engaged with L-shaped grooves 204B.

Preferably, a sealing feature is also provided between fitting member 348 and sealing member 350. As shown in FIG. 6, fitting member 348 is provided with a tapered ridge 368 running circumferentially around fitting member 348. Similarly, sealing member 350 is provided with a corresponding tapered channel 370 running circumferentially around sealing member 350. The terms "peripheral" and "circumferential" are adopted herewith to describe tapered ridge 368 and tapered channel 370 since tapered ridge 368 is disposed around the perimeter of an interior cavity formed within fitting member 348. Thus, peripheral tapered ridge 368 peripherally defines the opening of a cavity formed through fitting member 350. By providing ridge 368 and channel 370 with tapered surfaces, greater surface area is provided which allows an improved sealing engagement without increasing the diameter of the embodiment as is required, for example, to increase the sealing surface area when using a common flange joint.

Coupler 500 is provided with compressing edge 372 which biases compensating washer(s) 374 against abutting edge 376 of fitting member 348. Coupler 500 attaches to the external surface of sealing member 350 by the twist coupling method discussed previously and described in more detail hereinafter. Compensating washer(s) 374, shown best in FIG. 6, serves a dual purpose. Compensating washer(s) 374 provides compensation due to "creeping" (degradation of the seal due to thermal contraction) which occurs at low temperatures. Compensating washer(s) 374 also serves to bias coupler 500 in a direction which will hold pins 504 in the L-shaped grooves 204B and thus provides the tension necessary for proper operation of the twist coupling. In this regard, when pins 504 are seated in the L-shaped grooves 204B, compensating washer(s) 374 biases fitting member 348 towards sealing member 350, and thus assists in forming a proper seal.

As can be seen best in FIG. 6, fitting member 348 is provided with an abutting edge 376 while coupler 500 is provided with a compressing edge 372. One pin 504 and L-shaped groove 204B can be seen in the lower portion of FIG. 6. Compensating washer(s) 374 is positioned so that compressing edge 372 and abutting edge 376 are urged apart. Pins 504, grooves 204B, and compensating washer(s) 374, are arranged such that sealing contact between tapered ridge 368 and tapered channel 370 occurs when pins 504 are situated in grooves 204B. This arrangement provides that when pins 504 are received in the grooves 204B, compensating washer(s) 374 is partially or fully compressed.

It should be understood that compensating washer(s) 374 may be replaced by structures other than that shown and described in connection with FIG. 6 above. For example, if the embodiment is to be used only under moderate temperature and pressure conditions, compensating washer(s) 374 may be a washer of a resilient or elastic material, such as rubber. Depending upon the application, those skilled in the art will be able to determine what alternative structures and materials may be used for compensating washer(s) 374. The washer(s) 374 is preferably compressible so as to allow pins 504 to seat in grooves 204B while urging tapered ridge 368 into sealing engagement with tapered channel 370. This arrangement provides a coupling which is highly resistant to loosening due to vibration.

By the above-described arrangement, tapered ridge 368 is held in tight sealing arrangement with tapered channel 370. Note that a variety of means may be profitably employed to perform the functions enumerated herein, of providing a sealing engagement between first housing portion 202 and second housing portion 204. Fitting member 348 and sealing member 350 are examples of means for sealingly engaging first housing portion 202 and second housing portion 204. Accordingly, the structure disclosed herein simply represents one embodiment of structure capable of performing these functions. It should be understood that this structure is presented solely by way of example and should not be construed as limiting the scope of the present invention in any way.

Figure 7:
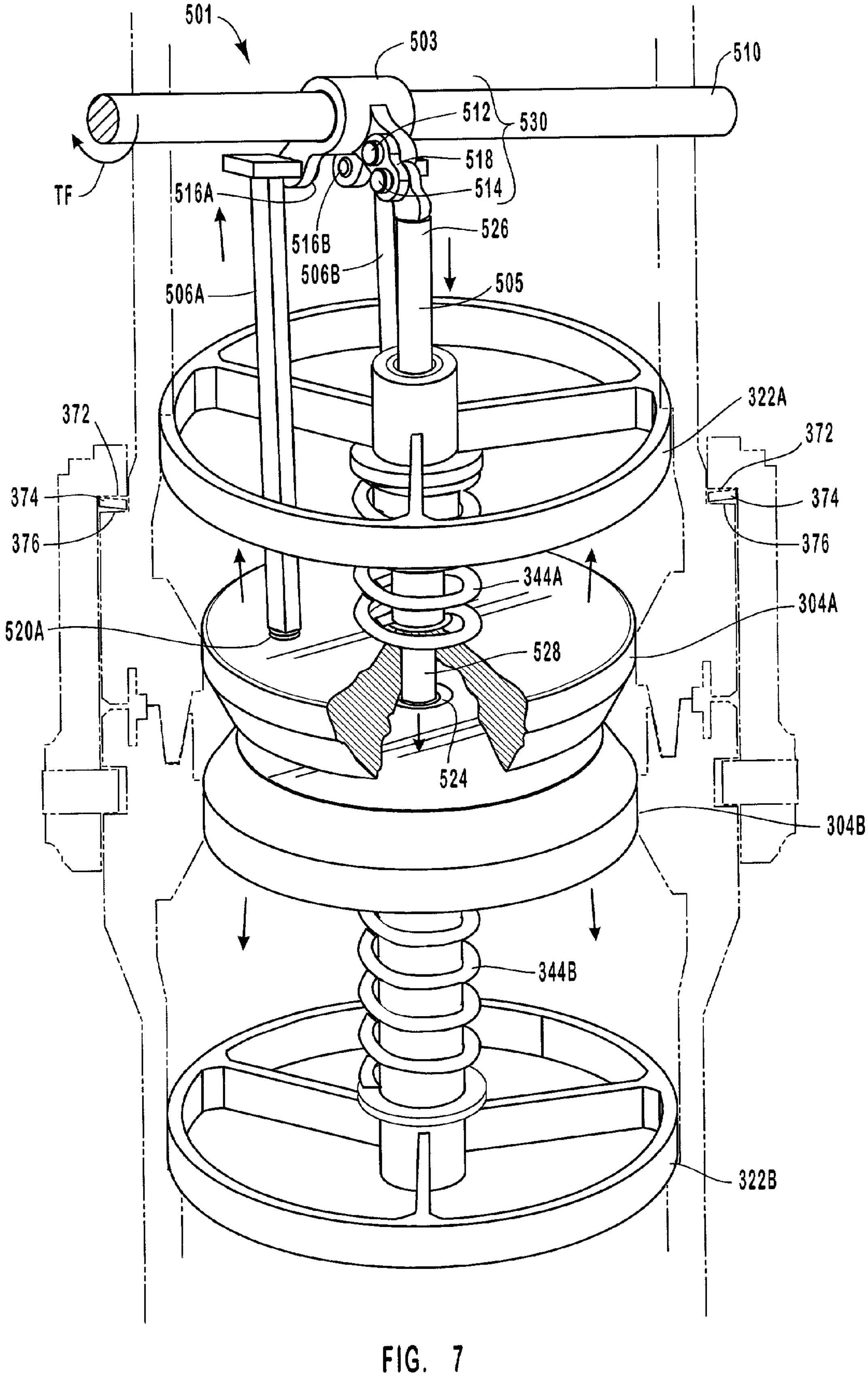
FIG. 7 is a perspective view illustrating various features of an exemplary embodiment of an actuating mechanism disposed within an embodiment of a dry break valve assembly.

In one embodiment, an actuating mechanism is used to operate the flow control assemblies 300A and 300B. FIG. 7 illustrates a perspective view of an actuating mechanism 501. Preferably, actuating mechanism 501 uses cam action in operation. Cam action refers generally to a sliding piece in a mechanical linkage used especially in transforming rotary motion into linear motion or vice versa.

As depicted in FIG. 7, actuating mechanism 501 has a cam handle 503. Cam handle 503 provides three attachment sites, 512, 516A, and 516B. Attached to site 512 is cam arm 518, which in turn is connected to driver 505 at attachment site 514. Driver 505 has a first end 526 and a second end 528. Driver 505 is shown in FIG. 7 to be essentially cylindrical in shape. However, it will be understood that driver 505 may be any geometric shape which will correspond with driver shaft 316 and guide bore 326A. Driver 505 is essentially a mechanical piece for imparting motion to components of the dry break valve assembly as will be discussed in further detail later in the specification. Attached to sites 516A and 516B are displacement shafts 506A and 506B. Displacement shafts 506A and 506B are shown in FIG. 7 to be essentially rectangular in shape. However, it will be understood that displacement shafts 506A and 506B may be manufactured in any geometric shape, such as cylindrical, elliptical, square, and the like, without departing from the scope of the present invention.

Preferably the connections of driver 505 and displacement shafts 506A and 506B to cam handle 503 at sites 512, 516A and 516B are pin connections such that the parts may be movably connected. However, it will be understood that such connections may be done in a variety of ways known to the art including, but not limited to a bolt, a screw, pins, and the like.

As shown in FIG. 2, cam handle 402, also referred to as an actuating lever, is connected to an actuating arm 510, which, in turn, is connected to an actuating lever 508. Actuating arm 510 is substantially disposed within first housing portion 202. Actuating arm 510 is preferably placed such that it is substantially over the center of actuating mechanism 501. Preferably actuating arm 510 and cam handle 503 are connected such that cam handle 503 cannot move independently of actuating arm 510.

FIG. 7 also shows valve gates 304A and 304B in relation to actuating mechanism 501. Valve gate 304A is shown operably connected to actuating mechanism 501 while valve gate 304B is disposed in operative relation to the actuating mechanism. Actuating mechanism 501 effects motion in both valve gate 304A and 304B at substantially the same time.

Valve gate 304A is shown with second end 528 of driver 505 disposed through bore 320. Preferably, in the resting position, second end 528 is substantially disposed within bore 320. However, it will be understood that second end 528 may be partly out of bore 320 without departing from the scope of the present invention. The driver 505 is sized to slidably pass through bore 320 without substantial obstruction from bore 320.

Displacement shafts 506A and 506B are shown to be connected to valve gate 304A at attachment sites 520A and 520B. Bore 320 and sites 520A and 520B are placed in a triangular configuration with sites 520A and 520B being placed substantially equidistant from bore 320. Sites 520A and 520B are also placed substantially equidistant from actuating arm 510 such that displacement shafts 506A and 506B are in substantial alignment with one another. Preferably the connections between displacement shafts 506A and 506B and connection sites 520A and 520B are pin connections such that the parts may be movably connected. However, it will be understood that the parts may be connected by known means in the art, such as, but not limited to, welding, bolting, and the like, without exceeding from scope of the present invention.

Figure 7A:
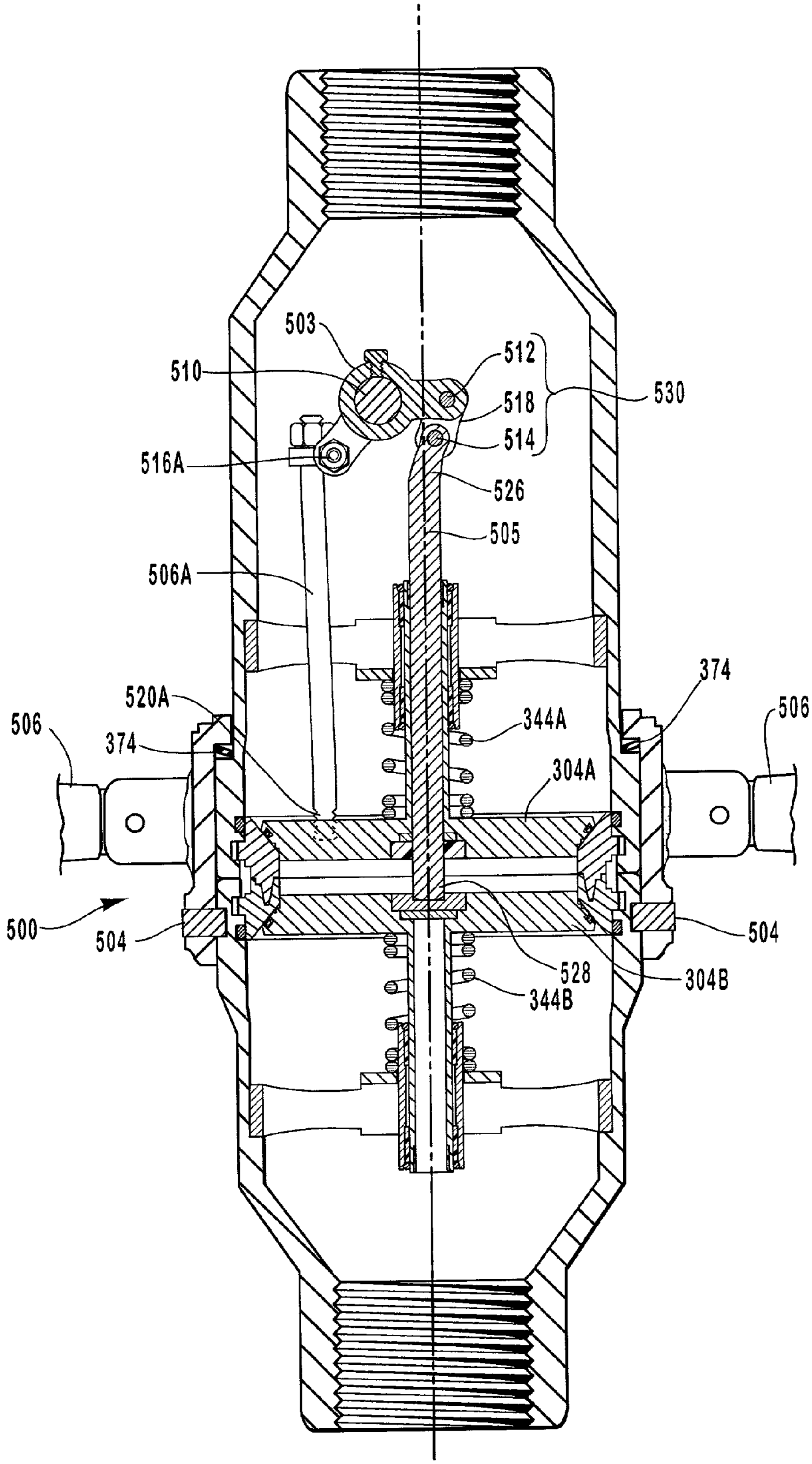
FIG. 7A is a side view illustrating various features of an embodiment of an actuating mechanism positioned so as to allow fluid flow through the dry break valve assembly.
Figure 7B:
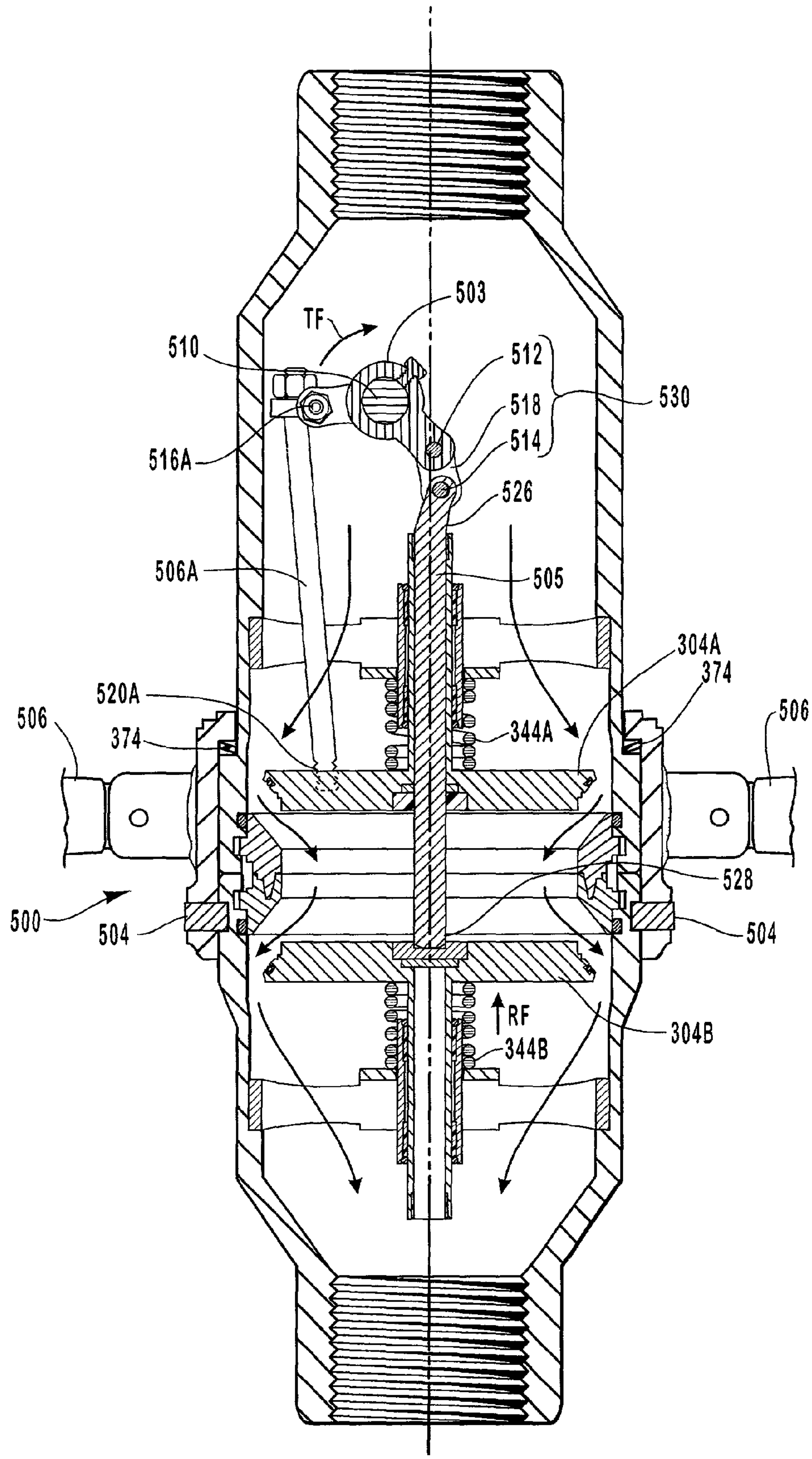
FIG. 7B is a side view illustrating various features of an embodiment of an actuating mechanism positioned so as to substantially prevent fluid flow through the dry break valve assembly.

Referring now to FIGS. 7A and 7B, the operation of actuating mechanism 501 will be discussed in detail. FIG. 7A shows a side view of actuating mechanism 501 at rest. Attachment site 512, cam arm 518, and attachment site 514 create a joint 530. Generally, actuating mechanism 501 operates as follows: the operator depresses the actuating lever 402 (shown in FIG. 2) and then the operator rotates actuating lever 402 which transmits a torque force (TF) through actuating arm 510 (not shown). The torque force (TF) is shown in FIG. 7B in the direction of the arrows. Such torque force (TF) rotates cam handle 503 which in turn rotates sites 512, 516A, and 516B (not shown). Thus, driver 505, and displacement shafts 506A and 506B (not shown) will be in motion at substantially the same time.

As cam handle 503 rotates, site 512 rotates in a downward direction forcing motion through cam arm 518 and, in turn, forcing driver 505 in a downward direction. Driver 505 passes through bore 320 such that second end 528 of the driver comes into contact with valve gate 304B. The downward motion of driver 505 pushes against valve gate 304B, which displaces valve gate 304B. The displacement of valve gate 304B forces resilient member 344B in a biased position. In one embodiment, located substantially at the center of valve gate 304B is a groove 524. The shape of groove 524 corresponds with the geometric shape of the end face of driver 505 such that driver 505 engages groove 524.

At substantially the same time as site 512 is in motion, sites 516A and 516B are rotating in an upward direction, thus pulling displacement shafts 506A and 506B in an upward direction. This upward motion pulls at attachment sites 520A and 520B (not shown), which in turn pulls valve gate 304A upward, displacing valve gate 304A. The displacement of valve gate 304A forces resilient member 344A in a biased position. Thus, at substantially the same time, valve gates 304A and 304B are displaced or opened to establish fluid communication between the valve gates. FIG. 7B shows a side view of the actuating mechanism in full operation (i.e., fully opened) with valve gates 304A and 304B being displaced or opened. Thus, at least indirectly, actuating mechanism 501 acts to open both valve gates 304A and 304B at substantially the same time.

When actuating mechanism 501 is in fully open, with valve assembly 200 completely assembled, actuating mechanism 501 will lock into place automatically. This automatic locking feature is provided by the equilibrium of forces provided by the torque force (TF) and an equal and opposite retention force (RF) created by resilient member 344B. During actuation, cam arm 518 acts to shift attachment site 512 from attachment site 514, such that the sites are offset from one another as shown in FIG. 7B.

In other words, when actuating mechanism 501 is completely actuated, joint 530 is in an overextended position. When actuating mechanism 501 is fully actuated, resilient member 344B is depressed in a biased position. The retention force (RF) created by biased resilient member 344B acts upwardly through valve gate 304B to driver 505 to keep joint 530 locked in an overextended position. Once the retention force (RF) is applied, the torque force (TF) is no longer required and actuating mechanism 501 will remain locked until the retention force (RF) is removed. Thus, the present invention provides for an automatic locking mechanism when the actuating mechanism 501 is fully opened and dry break valve assembly 200 is fully assembled.

In one embodiment, dry break valve assembly 200 has an automatic check valve feature (i.e., fail closed feature). When the sealing engagement between first housing portion 202 and second housing portion 204 is broken, valve assembly 200 automatically closes to prevent substantial leakage of fluid. As discussed above, valve gates 304A and 304B are maintained in the open position by applying a torque force (TF) and/or a retention force (RF). When actuating mechanism 501 is fully activated, and the torque force (TF) is removed, actuating mechanism 501 remains locked due to the retention force (RF) as discussed above. Releasing the retention force (RF) will cause actuating mechanism 501 to automatically close. Essentially, if no torque force (TF) or retention force (RF) is applied, actuating mechanism 501 is predisposed to spring back into its original position because resilient members 344A and 344B are biased in the closed position, i.e., valve gates 304A and 304B close at substantially the same time. Release of the retention force (RF) may occur when first housing portion 202 is separated from sealing engagement with second housing portion 204. It will be understood that separation of first housing portion 202 from second housing portion 204 may occur manually or automatically. Thus, the present invention provides for automatic checking of fluid flow whenever the valve assembly is disassembled, whether automatically or manually.

Figure 8:
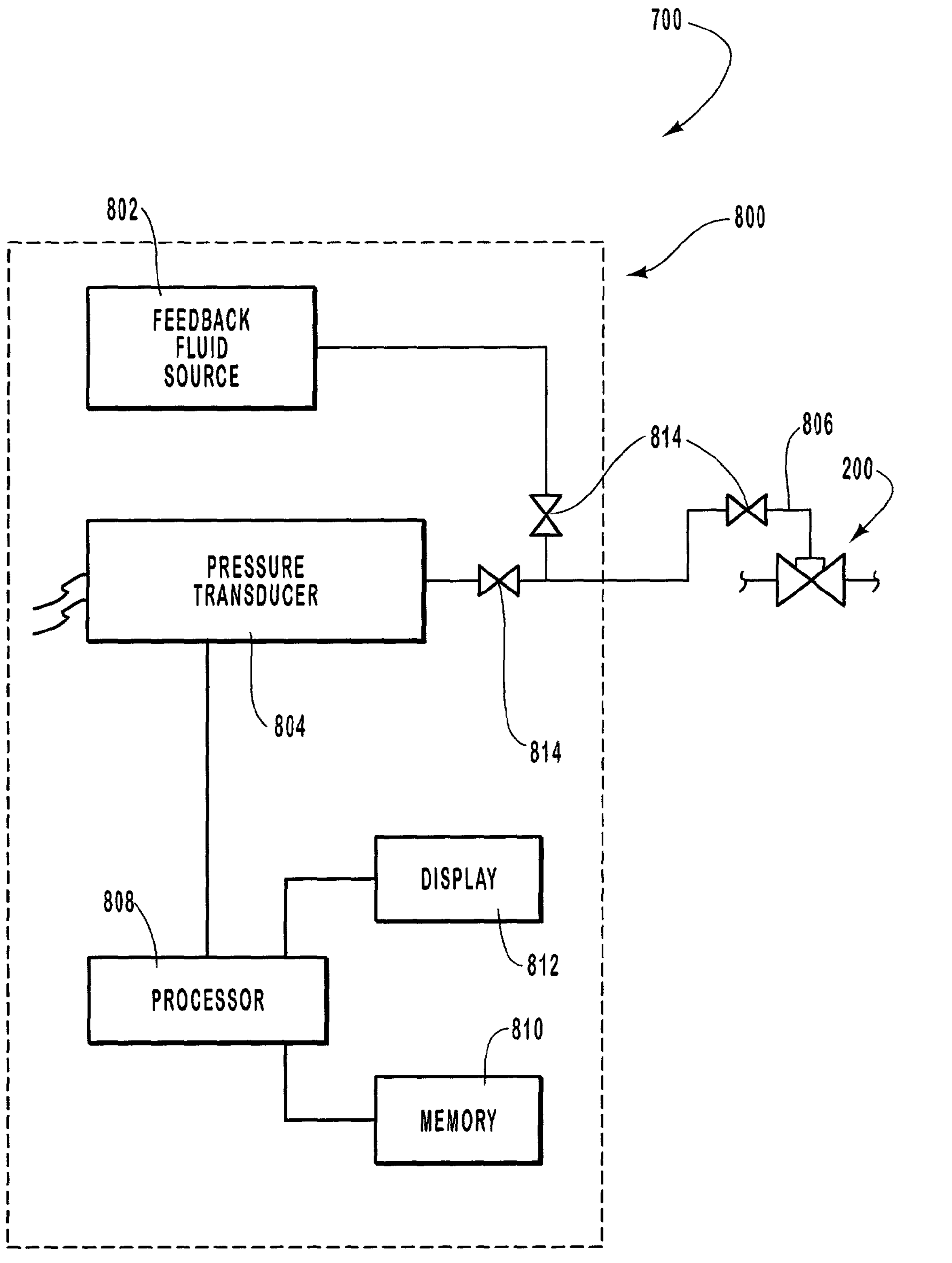
FIG. 8 is a schematic view that illustrates various features of an embodiment of a feedback system.

Directing attention now to FIG. 8, various details are provided regarding aspects of an alternative embodiment. In the exemplary embodiment illustrated in FIG. 8, a fluid system apparatus 700 is provided that comprises a dry break valve assembly 200 with associated coupling 500 (see, e.g., FIG. 7A), and feedback system 800.

In general, feedback system 800 comprises a feedback fluid source 802 arranged for fluid communication with a pressure transducer 804 or other suitable device, and with dry break valve assembly 200, by way of a sensor line 806 which may comprise any type of pipe, conduit, or tubing suitable for the particular application or environment where fluid system apparatus 700 is to be employed, and which may be constructed of a variety of materials, or combinations thereof, including, but not limited to, metals, plastics, or rubber. Feedback system 800 further includes a processor 808 in communication with pressure transducer 804, a memory 810 and display 812.

In applications where volatile materials such as hydrocarbons may be present, it is desirable to locate devices such as pressure transducer 804, which may produce sparks in some conditions, in an explosion-proof enclosure or other location where such hydrocarbons would be unlikely to come into contact with pressure transducer 804. The same is likewise true with regard to any other components disclosed herein that could, under certain conditions, generate a spark.

As indicated above, both feedback fluid source 802 and pressure transducer 804 are arranged for fluid communication with dry break valve assembly 200. Specific details concerning the interface between dry break valve assembly 200 and feedback system 800, and their related operational features, are provided below in the context of the discussion of FIGS. 9A and 9B. In general however, dry break valve assembly 200 includes two, or more, discreet portions (see FIGS. 9A and 9B) that, when joined together, cooperate to define a chamber 813 (see FIGS. 9A and 9B) capable of fluid communication, by way of sensor line 806, with pressure transducer 804 and feedback fluid source 802. In this exemplary embodiment then, the chamber 813 defined by dry break valve assembly 200 cooperates with feedback fluid source 802, pressure transducer 804, and sensor line 806 to collectively define the boundaries of a closed system having no outlet. In some embodiments, sealing devices including, but not limited to, gaskets and o-rings, comprising any suitable material(s), may be employed to facilitate formation and/or sealing of the chamber 813.

In addition to the aforementioned components, at least some embodiments of fluid system apparatus 700 further include a plurality of isolation valves 814 that permit feedback fluid source 802, pressure transducer 804, and/or dry break valve assembly 200 to be isolated for maintenance or replacement. Isolation valves 814, individually or collectively, may comprise gate valves, ball valves, globe valves, or any other device(s) that facilitate implementation of the functionality disclosed herein, and isolation valves 814 may comprise any material(s) compatible with the requirements of a particular application. Finally, various types of instrumentation including, but not limited to, pressure gauges and temperature gauges, may be included in fluid system apparatus 700 as appropriate.

Directing more specific attention now to feedback fluid source 802, the volume of fluid provided by feedback fluid source 802 may comprise any fluid(s) consistent with the functionality disclosed herein, wherein such fluids may include, but are not limited to, liquids, gases, or combinations thereof. In one exemplary embodiment of the invention, the fluid provided by feedback fluid source 802 comprises a substantially inert gas, nitrogen for example. However, any other suitable gas or liquid, or combination thereof, may be employed as necessary to suit the requirements of a particular application.

Further, in at least some embodiments of the invention, feedback fluid source 802 also includes a check valve or similar device or feature which allows feedback fluid to flow out of feedback fluid source 802 to pressure transducer 804 and to the chamber defined by dry break valve assembly 200, but does not allow fluid flow in the reverse direction. Feedback fluid source 802 may comprise a pump, compressor, or any other equipment capable of implementing the functionality disclosed herein.

Note that in one alternative embodiment, no feedback fluid source 802 is necessary. In this exemplary embodiment, a closed system is defined that is bounded by pressure transducer 804 or other suitable device, the chamber 813 defined by dry break valve assembly 200, and sensor line 806. A vacuum connection is provided in this closed system pump or any other equipment, system, or device capable of drawing a vacuum, generally referred to herein as "vacuum devices." Pressure gages and/or other suitable instrumentation are employed to verify the existence and magnitude of the vacuum. Moreover, the vacuum may be defined with respect to any suitable reference point. In one embodiment of the invention, the vacuum is defined with respect to atmospheric pressure.

As suggested by the foregoing discussion, equipment and devices such as the feedback fluid source 802 and vacuum pumps disclosed herein are but exemplary structures that function as a means for exerting pressure, which may be either positive or negative with respect to a predetermined reference pressure. As disclosed herein, such means for exerting pressure generally serve to, among other things, establish and maintain a predetermined pressure in a substantially closed system. Accordingly, it should be understood that such structural configurations are presented herein solely by way of example and should not be construed as limiting the scope of the present invention in any way. Rather, any other structure or device that is effective in implementing the functionality disclosed herein may alternatively be employed.

With respect now to pressure transducer 804, it was suggested earlier that a variety of means may be employed to implement the functionality of pressure transducer 804. Thus, pressure transducer 804 is but an exemplary structure that functions as a means for sensing fluid flow. Accordingly, it should be understood that such structural configurations are presented herein solely by way of example and should not be construed as limiting the scope of the present invention in any way. Rather, any other structure or device that is effective in implementing the functionality disclosed herein may alternatively be employed.

Figure 8A:
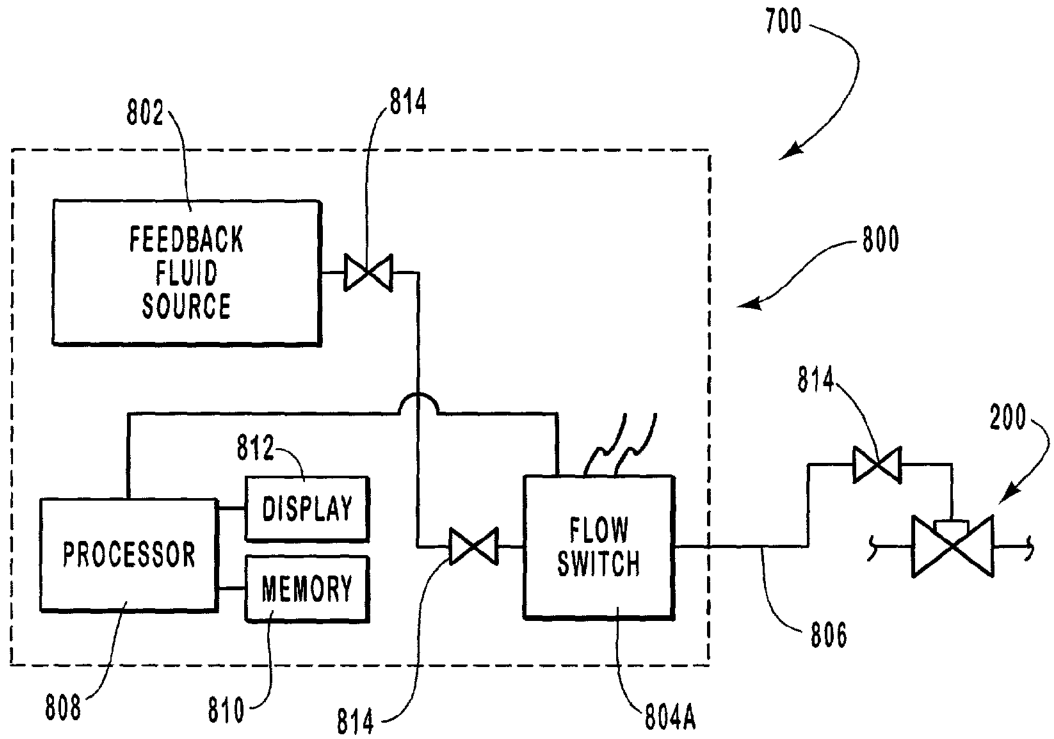
FIG. 8A is a schematic view of selected aspects of an alternative embodiment of the feedback system illustrated in FIG. 8.

By way of example, some embodiments of the invention may employ a flow switch instead of a pressure transducer. Such a configuration is illustrated in FIG. 8A. As suggested by its name, flow switch 804A would permit a determination to be made as to whether or not there was fluid flow through sensor line 806. Since fluid flow can only occur in response to a pressure differential, such as would be detected by a pressure transducer, flow switch 804A can be effectively substituted for pressure switch 804. Note that the sensitivity, and/or other operational variables, of flow switch 804A may be adjusted as necessary to suit the requirements of a particular application.

Figure 8B:
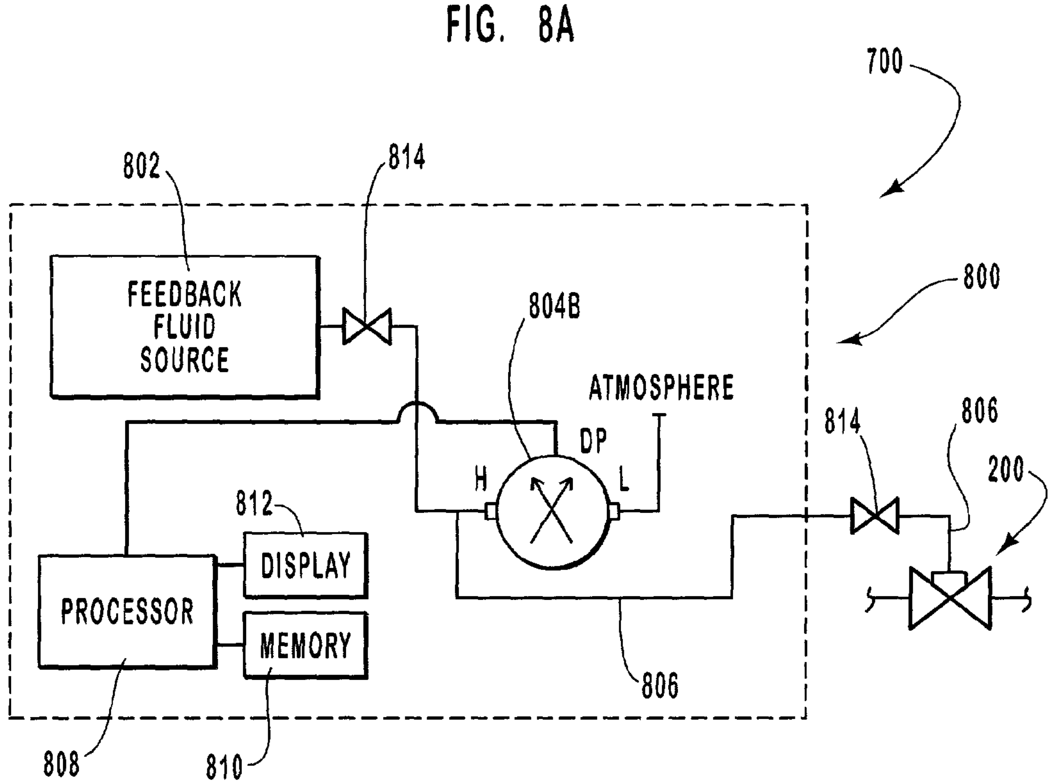
FIG. 8B is a schematic view of selected aspects of another alternative embodiment of the feedback systems illustrated in FIGS. 8 and 8A, respectively.

As another example, a differential pressure gauge 804B may alternatively be employed in place of pressure transducer 804, as indicated in FIG. 8B. In such an arrangement, the high pressure side of differential pressure gauge 804B is connected to sensor line 806 and the low pressure side of differential pressure gauge 804B is exposed to atmospheric pressure. Any change in a predetermined pressure differential between the high pressure side (sensor line 806) and the low pressure side (atmospheric) of the differential pressure gauge, would serve to indicate that flow was occurring through sensor line 806.

Other arrangements of differential pressure gauge 804B that would be effective in implementing such functionality may alternatively be employed. For example, differential pressure gauge 804B may be configured so that both the high and low pressure ports are in fluid communication with sensor line 806. In a "no flow" condition, the differential pressure reading would be zero. In the event of flow through sensor line 806, a non-zero differential pressure would be indicated at differential pressure gauge 804B. As in the case of flow switch 804A, the sensitivity, and/or other operational variables, of differential pressure gauge 804B may be adjusted as necessary to suit the requirements of a particular application. Like pressure transducer 804, flow switch 804A and differential pressure gauge 804B each comprise an exemplary structure that function as a means for sensing fluid flow.

Note that the exemplary flow switch and differential pressure gauge configurations illustrated in FIGS. 8A and 8B, respectively, may each be employed using feedback fluid source 802, or may alternatively be employed in a vacuum configuration, at least one embodiment of which is disclosed herein.

Figure 9A:
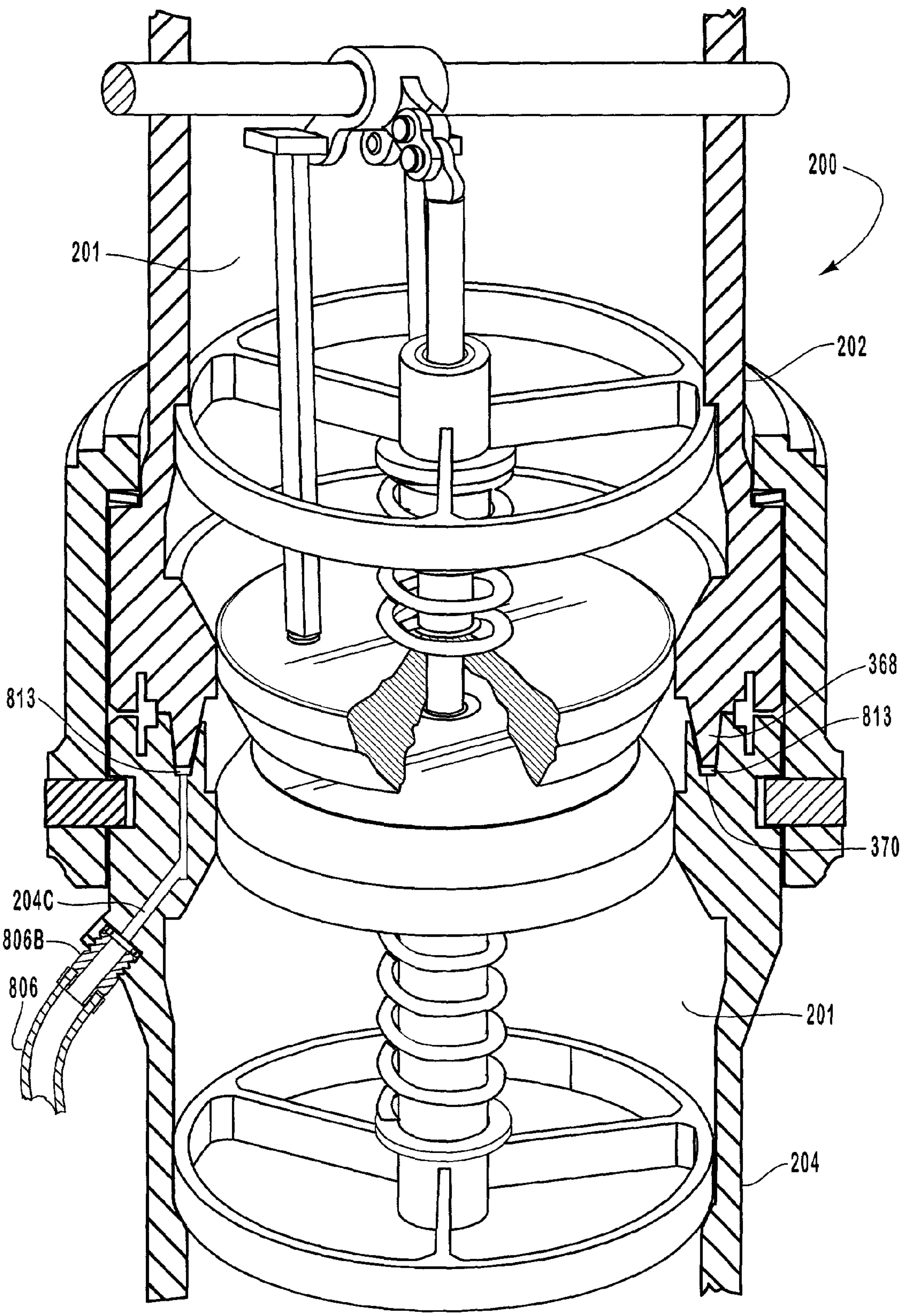
FIG. 9A is a cutaway view of an embodiment of an exemplary fluid system component, specifically a dry break valve assembly, configured for use with a feedback system.

With continuing attention to FIGS. 8 through 8B, and directing attention now to FIG. 9A, details are provided concerning various aspects of the relation between feedback system 800 and dry break valve assembly 200 of fluid system apparatus 700. As disclosed elsewhere herein and as indicated in the exemplary embodiment of dry break valve assembly 200 illustrated in FIG. 9A, first housing portion 202 defines a tapered ridge 368 that is received within a tapered channel 370 defined by second housing portion 204 when first housing portion 202 and second housing portion 204 are joined together.

In the embodiment illustrated in FIG. 9A, tapered ridge 368 and tapered channel 370 are configured so that when tapered ridge 368 is fully received within tapered channel, an annular gap, or chamber 813, is defined by the bottom of tapered ridge 368, and tapered channel 370. Note however that the embodiment illustrated in FIG. 9A is exemplary only and variables including, but not limited to, the geometry and arrangement of tapered ridge 368, tapered channel 370, and chamber 813 may be modified or adjusted as necessary to suit the requirements of a particular application, equipment, or environment.

By way of example, components of dry break valve assembly 200 other than, or in addition to, first housing portion 202 and second housing portion 204, may be employed to define chamber 813. As another example, more than one chamber 813 may be defined, depending on the requirements of a particular application. As yet another example, it may be desirable in some embodiments to configure chamber 813 in such a way that it is in fluid communication with one or more portions of fluid passageway 201 defined by dry break valve assembly 200. However, any configuration that facilitates implementation of the functionality disclosed herein may be employed. Accordingly, the scope of the invention should not be construed to be limited solely to the disclosed embodiments.

Directing continuing attention to FIG. 9A, and with continued reference to FIGS. 8 through 8B, further details are provided concerning the interface between dry break valve assembly 200 and feedback system 800. As indicated in the exemplary embodiment illustrated in FIG. 9A, a feedback port 204C is defined that extends through second housing portion 204 and communicates with chamber 813. One or more fitting(s), such as fitting 806B, serve to facilitate connection of sensor line 806 to feedback port 204C, and thereby enable fluid communication between sensor line 806 and chamber 813. In one embodiment of the invention, fitting(s) 806B comprise removable compression-type fittings.

In yet other embodiments, one or more of fittings 806B may be permanently attached to sensor line 806 and/or second housing portion 204 to allow, for example, selective fluid communication between chamber 813 and feedback port 204C. However, any other type of fittings and/or connection may be employed that are consistent with the functionality disclosed herein. Moreover, in the event the feedback port is defined in the housing portion of dry break valve assembly 200 that is attached to a mobile unit, such as a tanker truck, fittings 806B, for example, permit a user to connect and disconnect feedback fluid source 802 with chamber 813 as/if required, as suggested above.

Similarly, various aspects of feedback port 204C may be varied as necessary to suit the requirements of a particular application. For example, feedback port 204C may be constructed so that it can be capped. As another example, feedback port 204C may alternatively be defined by first housing portion 202, as discussed below. Further, it may be desirable in some cases to employ multiple ports 204C. Generally however, any configuration and/or arrangement of feedback port 204C that facilitates implementation of the functionality disclosed herein may be employed.

Figure 9B:
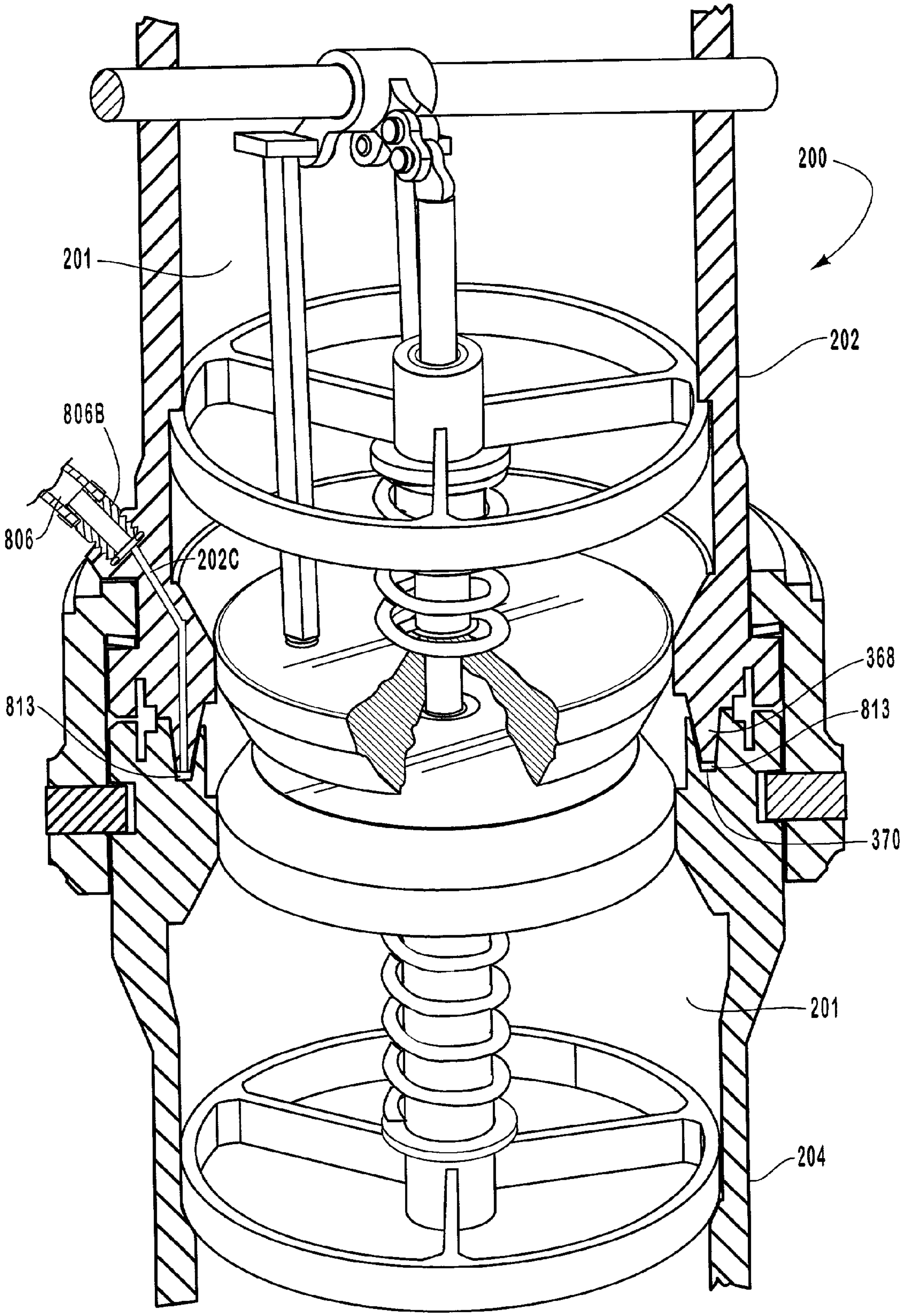
FIG. 9B is a cutaway view of an alternative embodiment of an exemplary fluid system component, specifically a dry break valve assembly, configured for use with a feedback system.

Directing attention now to FIG. 9B, aspects of an alternative embodiment of dry break valve assembly 200 and feedback system 800 are illustrated. Generally, the operational aspects of the embodiment illustrated in FIG. 9B are substantially the same as those of the embodiment illustrated in FIG. 9A. Moreover, the embodiment illustrated in FIG. 9B is generally similar in other regards to the embodiment illustrated in FIG. 9A except that the feedback port, denoted at 202C in FIG. 9B, is defined in first housing portion 202 instead of being defined in second housing portion 204 (FIG. 9A). Such an arrangement may be desirable where, for example, second housing portion 204 comprises part of a fluid delivery system attached to a tanker truck and it would be impractical to provide a hard pipe connection between feedback fluid source 802, located at a fluid transfer facility, and second housing portion 204.

Figure 10:
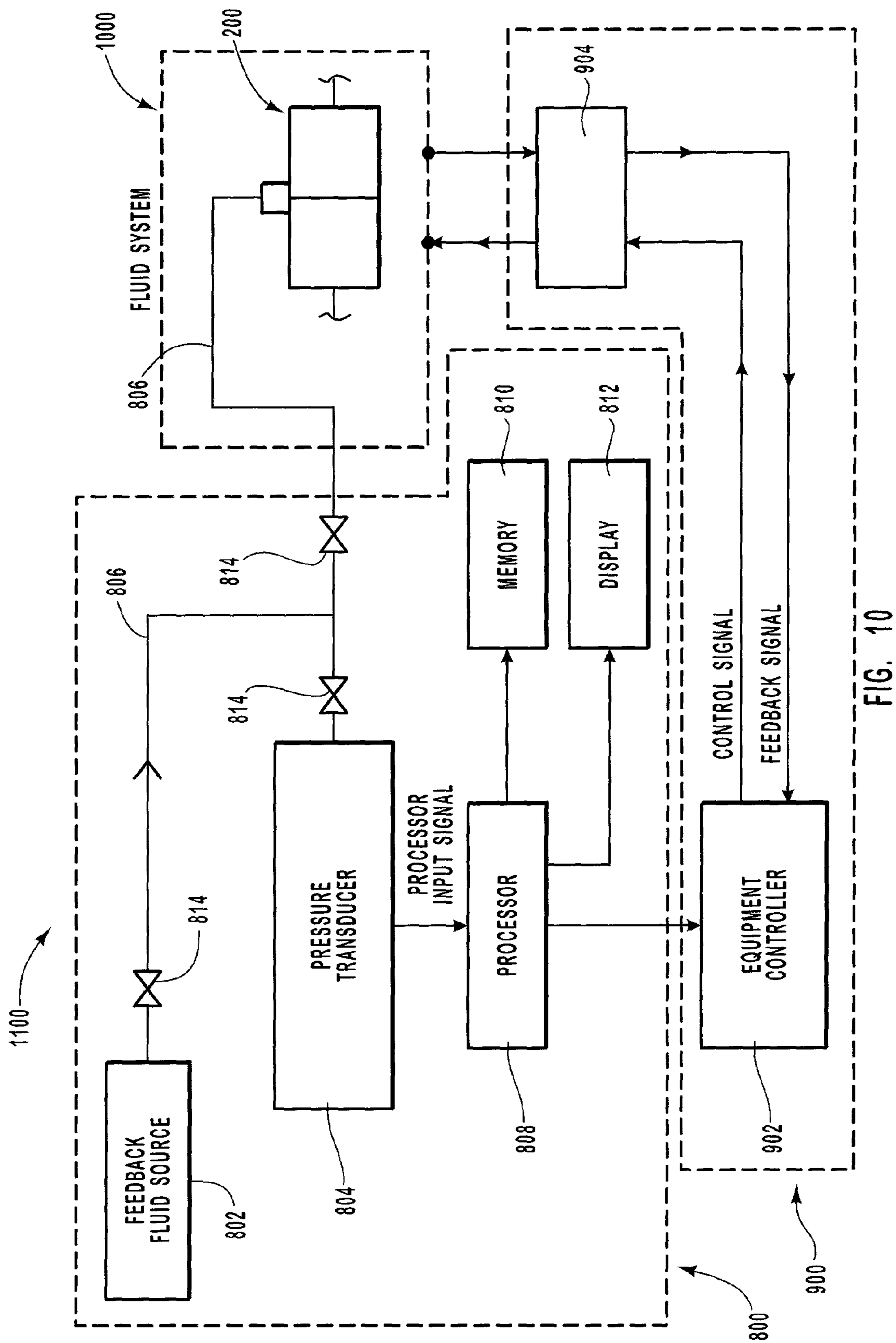
FIG. 10 is a schematic view of an embodiment of a feedback system employed in conjunction with a control system.
Figure 11:
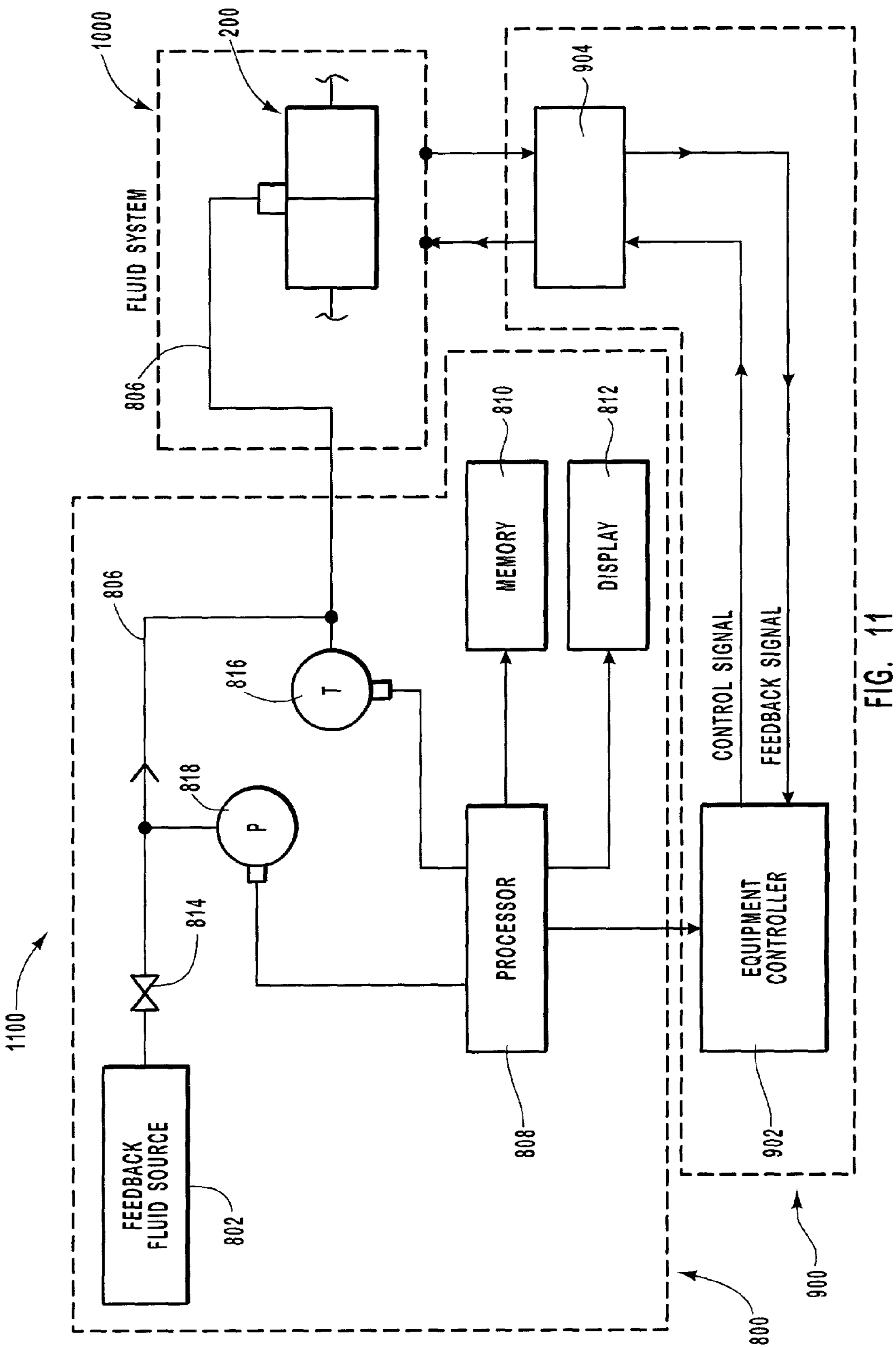
FIG. 11 is a schematic view of an embodiment of a feedback system configured to generate line fluid leakage data.
Figure 12:
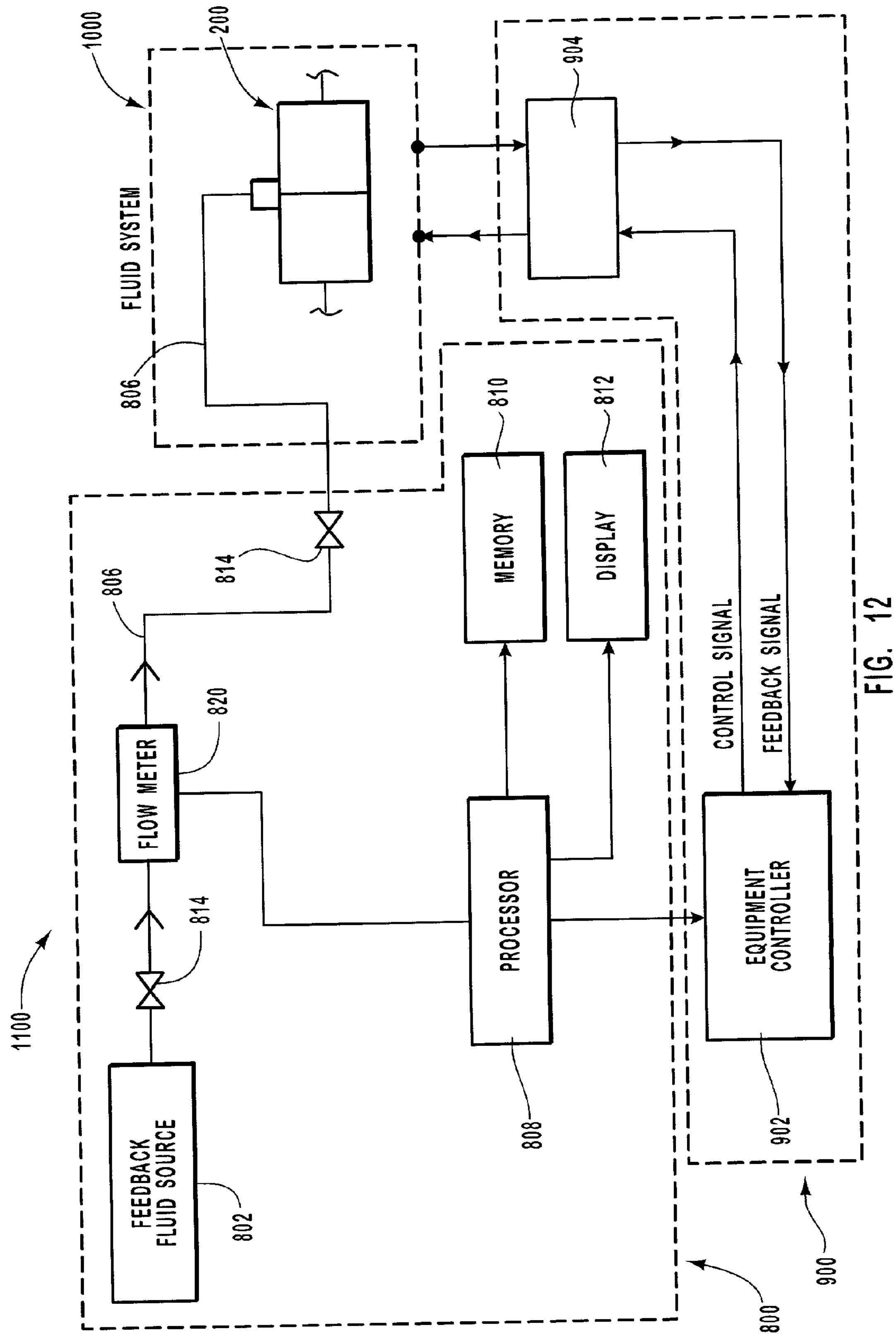
FIG. 12 is a schematic view of an alternative embodiment of a feedback system configured to generate line fluid leakage data.

With continued attention to FIGS. 8 through 9, details are provided regarding various operational aspects of fluid system apparatus 700, directing attention initially to an exemplary embodiment of feedback system 800. Note in this regard that various alternative embodiments of feedback system 800 (aspects of which are illustrated in FIGS. 11 and 12) are discussed below as they relate to, among other things, measurement of line fluid leakage from fluid system 1000 (FIGS. 10 through 12).

With respect to the embodiment illustrated in FIGS. 8 through 9, at least, feedback system 800 serves to give an operator or other personnel some assurance as to the integrity of the joint cooperatively formed, for example, by first housing portion 202 and second housing portion 204 of dry break valve assembly 200. Note however that, while feedback system 800 may be employed in conjunction with dry break valve assembly 200, as in the case of fluid system apparatus 700, such employment is exemplary only and feedback system 800 may, more generally, be employed in any application or environment where it is desired to obtain information, and/or implement one or more actions, concerning the integrity of one or more joints.

In operation, isolation valves 814 are opened, and feedback fluid source 802 transfers feedback fluid to the closed system bounded by feedback fluid source 802, pressure transducer 804, sensor line 806, and chamber 813, until such time as a predetermined pressure level is reached. The pressure of the feedback system fluid provided by feedback fluid source 802 may be selected as required based on the requirements of the particular application. As noted earlier, feedback fluid source 802 may not be required in all instances and, instead, a vacuum arrangement may be used in various embodiments of feedback system 800.

After a predetermined pressure has been established, the closed system collectively defined by feedback fluid source 802, pressure transducer 804, sensor line 806, and chamber 813, will then be in a condition of static fluid equilibrium, that is, a condition where the pressure of the feedback system fluid is constant throughout the closed system and, accordingly, no pressure differential will be sensed by pressure transducer 804. This static fluid pressure will be maintained, at least in part by feedback fluid source 802, in the closed system so long as first housing portion 202 and second housing portion 204 are properly joined together.

Thus, a signal generated and transmitted by pressure transducer 804 under such static equilibrium conditions serves to indicate that, in the case of first housing portion 202 and second housing portion 204 for example, tapered ridge 368 of first housing portion 202 is fully received, and properly seated, within tapered channel 370 defined by second housing portion 204.

Because first housing portion 202 and second housing portion 204 can be verified in this way to be properly joined together, a system operator can obtain a relatively high level of assurance as to the integrity of the joint formed by first housing portion 202 and second housing portion 204 and can, accordingly, transfer fluid through dry break valve assembly 200 with a relatively high level of confidence that no leaks will occur. Thus, it is a feature of at least some embodiments of the invention that a system operator can prospectively, and reliably, ensure the integrity of the joint (s) defined by dry break valve assembly 200. This feature is particularly useful where, for example, dry break valve assembly 200 is to be used in conjunction with the processing of hazardous materials.

A related feature is that embodiments of the invention are effective in providing joint integrity feedback to the system operator during and after fluid processing operations, as well as beforehand. With specific reference to FIGS. 9A and 9B, the integrity of the joint formed by first and second housing portions 202 and 204, respectively, can be monitored without regard to whether valve gates 304A and 304B are in the "open" or "closed" position. As another example, in the event that a change occurs to the pressure of the feedback fluid during pumping operations, thus indicating a loss of joint integrity, a system operator may take appropriate remedial action concerning the system within which dry break valve assembly 200 is employed, such as, but not limited to, shutting down the pump. As discussed in greater detail below, such remedial actions may alternatively be performed automatically and substantially in real-time.

As suggested above, it is also a feature of embodiments of the invention that feedback system 800 can be configured to be quite sensitive, as even a slight misalignment or separation of first housing portion 202 and second housing portion 204 may permit feedback fluid to leak from chamber 813, thereby triggering a feedback fluid pressure change that would be sensed by pressure transducer 804. Such sensitivity is useful at least because such slight misalignments or separations would be unlikely to be identified during a simple visual inspection for example. Moreover, such sensitivity is desirable in those cases where hazardous materials are being processed and even very small spills are unacceptable.

Of course, in other applications, slight misalignments or other conditions may be permissible, and the sensitivity, and/or other pertinent operating parameters, of pressure transducer 804, or other components of feedback system 800, can be adjusted accordingly. It may also be desirable in some cases to adjust the sensitivity, and/or other pertinent operating parameters, of pressure transducer 804 to compensate for thermal expansion and/or contraction, and the attendant pressure changes, of the feedback fluid.

As noted above, static equilibrium in the closed system should be maintained so long as first housing portion 202 and second housing portion 204 are properly joined together and so long as there are no significant leaks elsewhere. However, in the event first housing portion 202 and second housing portion 204 are not properly joined together, or separate for some reason (thereby causing flow control assemblies 300A and 300B to automatically shut and prevent further flow through dry break valve assembly 200), some or all of the pressurized feedback system fluid will leak from chamber 813, for example, past tapered ridge 368 and into fluid passageway 201. Depending upon the nature of the defect in the joint formed by first housing portion 202 and second housing portion 204, the feedback system fluid may additionally, or alternatively, escape from dry break valve assembly 200 into the surrounding environment.

It was noted earlier that fluid flow in this case implicates a change in pressure that will be sensed by pressure transducer 804. Accordingly, pressure transducer 804 then generates and transmits a signal, which may be digital or analog, to processor 808, that serves to signify that the integrity of the joint being monitored, in this case, the joint cooperatively defined by first housing portion 202 and second housing portion 204, has been compromised in some way. As discussed below with reference to FIG. 10, this signal can then acted upon by processor 808 so as to enable appropriate action(s) to be taken concerning the system within which dry break valve assembly 200 is employed.

With continuing attention to FIGS. 8 through 9, further details are provided regarding the operational aspects of feedback system 800. As noted earlier, feedback system 800 includes one or more processors 808 in communication with a memory 810 and display 812. Note that processor 808, memory 810, and display 812 collectively comprise, in some embodiments, a computer or similar device, and that such computer or device may further comprise components such as, but not limited to, input devices such as keyboards, output devices, modems, and media readers and writers such as optical or magnetic disk drives. Further, such computer may be a portable device, and may be employed in a stand-alone configuration, or in conjunction with a computer network.

As discussed in further detail below, processor 808 is also configured for communication with, among other things, an equipment controller 902 (FIG. 10). Communication between processor 808 and equipment controller 902, as well as communication among the various components of feedback system 800, and control system 900 (FIG. 10), may comprise wireless communication, and/or hardwire-based communication.

In operation, one or more signals generated by pressure transducer 804 are transmitted to processor 808. As described elsewhere herein, such signal(s) generally serve to indicate the status of the pressure in the closed system collectively defined by feedback system fluid source 802, pressure transducer 804, and chamber 813, wherein such status may include, but is not limited to, static feedback fluid pressure, and a change in feedback fluid pressure. Note that, as disclosed herein, pressure transducer 804 may also be used to monitor, and generate and send corresponding signals relating to, a vacuum present in the closed system collectively defined by feedback system fluid source 802, pressure transducer 804, and chamber 813. Finally, the signal(s) transmitted by pressure transducer 804 may be transmitted substantially continuously or on a predetermined intermittent basis. One or more pressure transducers 804 may be used to monitor a single joint, or multiple joints, depending upon the requirements of a particular application.

As suggested in FIGS. 8 through 9, the value, and/or other variables concerning the signal(s) produced by pressure transducer 804 or any other component in communication either directly or indirectly with processor 808, may be stored in memory 810 so that a historical record of data concerning the integrity of the joint formed in dry break valve assembly 200, and/or any other joint(s) of interest whether or not such joints are defined either in whole or in part by dry break valve assembly 200, may be created and preserved. Examples of data types that may be gathered and/or stored include, but are not limited to, the pressure of the feedback fluid, the time at which such pressure was measured, the magnitude of the change in pressure of the feedback fluid, and the time at which such change in pressure occurred.

As further suggested in FIGS. 8 through 9, one or more aspects of the signal(s) produced by pressure transducer 804 and transmitted to processor 808 may be presented on display 812 in a form and manner consistent with the particular application with which feedback system 800 is employed. By way of example, the magnitude of the pressure of the feedback fluid as a function of time may be plotted and displayed.

Moreover, a variety of means may be employed to perform the functions of feedback system 800. Thus, the embodiments of feedback system 800 disclosed herein are but exemplary structures that function as a means for monitoring joint integrity. Accordingly, it should be understood that the structural configurations of feedback system 800 disclosed herein are presented solely by way of example and should not be construed as limiting the scope of the present invention in any way. Rather, any other structure, feature, or combination thereof, that is effective in implementing the functionality of feedback system 800 may alternatively be employed. By way of example, and as suggested above, some embodiments of the present invention are directed to a feedback system 800 that includes a flow switch 804A, or differential pressure gauge 804B, in place of pressure transducer 804.

Note that while at least one embodiment of feedback system 800 may be employed in conjunction with dry break valve assembly 200, the scope of the invention should not be construed to be limited solely to that application. In fact, feedback system 800 may be employed in conjunction with any fluid system component which includes discrete elements that cooperate to form a joint whose integrity is of interest or concern. Accordingly, embodiments of feedback system 800 may be employed in conjunction with fluid system components such as, but not limited to, a pair of pipe flanges that, when joined together, form a joint and associated chamber. Alternatively, feedback system 800 may be employed in conjunction with a joint formed by two distinct fluid system components, such as the joint formed by a valve flange and a tank flange. The foregoing are exemplary only however, and the scope of the present invention should not be construed to be limited to any particular arrangement of one or more fluid system components. In fact, as discussed below, the scope of the present invention is not limited to fluid systems.

Specifically, the joint(s) to be monitored need not be concerned at all with the fluid systems, and may, in fact, comprise any joint whose integrity is of interest or concern. By way of example, a joint in a machine may be designed so as to form a chamber when two discrete elements of the machine are fastened together. Moreover, the chamber need not necessarily be defined by the joint. Instead, any chamber that is configured such that a pressure change in the chamber corresponds in some manner to a loss of joint integrity may be employed. Note that while, in the case of devices such as dry break valve assembly 200, where the chamber is substantially defined solely by the device itself, other configurations and devices may be employed wherein the chamber is only partially defined by the device, and wherein additional structures or devices are employed to more completely define the chamber.

As the foregoing example suggests, embodiments of feedback system 800 may be employed with any device having two or more discrete elements that cooperate to form a joint. Note that, as contemplated herein, "device" may comprise either a single structure or multiple structures, and the "discrete elements" of such device may refer to separate portions of a single structure that comprises the device, or may alternatively refer to separate structures that collectively comprise the device.

In view of the foregoing, feedback system 800 may be employed with any joint and chamber configuration, without being limited to a specific manner or structure concerning the formation and/or configuration of such joint and/or chamber. Accordingly, embodiments of the invention should not be construed to be limited to any particular structural configuration or arrangement.

With continuing attention now to FIGS. 8 through 9, and directing attention now to FIGS. 10 through 12, details are provided concerning various aspects of an exemplary embodiment of a control system 900. As indicated in those figures, control system 900 includes one or more equipment controllers 902 in communication with processor 808. One feature of such an arrangement is that the signal(s) produced by, for example, pressure transducer 804, can be used to implement various actions with respect to fluid flow through dry break valve assembly 200 or, more generally, the fluid system 1000 within which dry break valve assembly 200 is employed.

In the illustrated embodiment, the signal(s) received by processor 808 from pressure transducer 804 causes processor 808 to generate one or more appropriate sets of instructions which are then transmitted to equipment controller 902. In response, equipment controller 902 generates a corresponding control signal which is then used to implement, by way of equipment 904 including, but not limited to, pumps, valves, and other equipment, one or more particular actions with respect to fluid system 1000.

The response of fluid system 1000 is returned to equipment controller 902 in the form of a feedback signal. By comparing the feedback signal with the instructions received from processor 808, equipment controller 902, if necessary, generates another control signal so as to cause the associated equipment 904 to adjust, for example, the performance or operational characteristics of fluid system 1000. Thus, the integrity, or lack thereof of the joint defined either in whole or in part by dry break valve assembly 200, or by any other component or device to be monitored, can be used to cause various actions or omissions of action, as applicable, with respect to the system within which such component or device is employed. In other embodiments, the control signal generation and comparison is performed by processor 808.

Note that, as contemplated herein, "equipment controller" refers to any circuits, systems, and/or devices that use input from feedback system 800 and from equipment 904 to regulate or manage any aspect of the performance or operation of fluid system 1000. Consistent with the foregoing, at least one embodiment of the invention, discussed below, includes an equipment controller 902 that comprises a start/stop controller of a fluid pump.

Specifically, in one exemplary embodiment of control system 900, pressure transducer 804 is interlocked with an equipment controller 902 that comprises a start/stop controller of a fluid pump which is in fluid communication with dry break valve assembly 200. One feature of such an exemplary arrangement is that in the event pressure transducer 804 generates, and transmits to processor 808, a signal indicating a loss of integrity in the monitored joint, processor 808 will then generate and send appropriate instructions to the start/stop controller associated with the fluid pump, thereby preventing startup of the fluid pump and thus, preventing leakage from dry break valve assembly 200. A related feature is that such an arrangement affords substantially real-time control of fluid system 1000 within which the fluid pump and dry break valve assembly 200 are employed. The real time control feature is also germane to those embodiments wherein feedback system 800 and/or control system 900 is employed with other than fluid systems.

Control system 900 is not, however, limited solely to the foregoing exemplary functionality. In other embodiments of the invention, control system 900 may be employed to reduce the pressure of the flow through dry break valve assembly 200 to a level that would substantially foreclose, or at least reduce, leakage, even in the event that integrity of the joint is lost, and/or control system 900 may be used to vary the flow rate or other variables of the flow associated with dry break valve assembly 200.

In general, embodiments of control system 900 may be employed to, among other things, cause the performance of various actions corresponding to a particular state of joint integrity. Accordingly, embodiments of the invention should not be construed to limited solely to the exemplary functionalities or features disclosed herein. Moreover, embodiments of control system 900 are not limited solely to fluid systems applications but, more generally, may be employed in the context of any system where it is desired to monitor the integrity of one or more joints and/or cause the implementation of one or more actions, corresponding to various states of joint integrity, concerning the system or device within which the monitored joint(s) are present. Finally, embodiments of control system 900 may be combined with embodiments of feedback system 800 to form a fluid management and control system 1100.

With more specific attention now to FIGS. 11 and 12, details are provided concerning various aspects of alternative embodiments of feedback system 800. Specifically, some embodiments of the invention may include provisions for using the signal(s) generated by pressure transducer 804 (see, e.g., FIG. 10), or other equipment or devices, to generate quantitative data concerning any leakage that may occur, for example, from chamber 813 of dry break valve assembly 200. As an example, in the event leakage is occurring from chamber 813, pressure differential data gathered by pressure transducer 804 over a period of time can be transmitted to processor 808 and used to determine, among other things, the rate at which such leakage is occurring, as well as the specific amount of feedback system fluid that is lost, and/or the amount of line fluid that is lost from fluid system 1000, wherein "line fluid" refers to the fluid or material passing through and/or processed by way of, fluid system 1000, as distinct from the feedback system fluid discussed elsewhere herein. As discussed below, the ability to make such determinations may prove useful in some applications.

At least in cases where the feedback system fluid comprises a compressible fluid, conservation of mass principles for compressible fluids can be used to derive the rate at which feedback system fluid is leaking from chamber 813. Such principles can also be employed in conjunction with those embodiments where a vacuum arrangement is employed in the place of a feedback system fluid because, in the event of a loss of joint integrity, a flow of atmospheric air, a compressible fluid, into the chamber 813 will occur.

The following gas dynamics equations may be used in conjunction with the determination of mass flow rates of compressible fluids (note that it is implicit in Equations 1 and 2 below that the feedback system fluid or atmospheric air, as applicable, acts as a perfect gas and that any flow of the feedback system fluid is substantially frictionless):

$$V\times(\partial\rho/\partial t)-m=0 \Rightarrow m=V\times(\partial\rho/\partial t) \quad \text{Equation 1}$$

$$\partial\rho/\partial t=(\partial\rho/\partial t)/RT \Rightarrow m=V\times((\partial\rho/\partial t)/RT) \quad \text{Equation 2}$$

where:

V=volume of space containing the feedback system fluid (known)

m=mass flow rate (to be calculated)

R=feedback system fluid constant (given)

T=feedback system fluid temperature (measured)

p=pressure of the feedback system fluid (measured)

t=time (measured)

$\partial p/\theta t$=rate of pressure change (measured)

ρ=feedback system fluid density (known)

$\partial\rho/\partial t$=rate of feedback system fluid density change (calculated)

In this exemplary embodiment, the volume V can be readily determined by metering the amount of feedback system fluid that is introduced by feedback fluid source 802 (or removed by a vacuum device, as applicable) into the closed system collectively defined, for example, by feedback fluid source 802, thermometer 816, pressure gauge 818, sensor line 806, and chamber 813. Moreover, the gas constant R for nitrogen, for example, is 0.2968 kJ/kg×K and can be easily obtained from a gas table, and the temperature T of the feedback system fluid is readily ascertained by way of a thermometer 816 (FIG. 11) in fluid communication with sensor line 806. In the illustrated embodiment, thermometer 816 is configured to transmit feedback system fluid temperature data to processor 808. Similarly, pressure gauge 818 is arranged for fluid communication with sensor line 806 and is configured to transmit feedback system fluid pressure data to processor 808.

By receiving, on a substantially continual basis, or other desirable time basis, the feedback system fluid temperature T data from thermometer 816 and feedback system fluid pressure p data from pressure gauge 818, correlating at least the feedback system fluid pressure data to time t, and by combining such data with the known values of V and R, in the manner suggested by Equations 1 and 2, processor 808 is able to use an algorithm embodying Equations 1 and 2 to calculate, on a real-time basis, the mass flow rate m, if any, of the feedback system fluid out of chamber 813.

Note that because the presence of pressure gauge 818 permits the value of pressure p to be measured, on a continual or other basis, as a function of time t, the pressure differentials, as well as changes in pressure with respect to time, can be readily calculated by processor 808, thereby obviating the need, at least in the exemplary embodiment illustrated in FIG. 11, for pressure transducer 804. It may be desirable in other cases however, to employ both pressure transducer 804, or other equipment, and pressure gauge 818.

Further, because feedback system 800 is able gather and process feedback system fluid temperature data, some embodiments of feedback system 800 are configured to compensate for changes in the pressure of the feedback system fluid that result from conditions other than a loss of joint integrity. As an example, a decrease in ambient temperature would likely cause the pressure of the feedback system fluid to drop, thereby resulting in generation of a pressure drop signal that could erroneously be interpreted to indicate a loss of joint integrity.

Moreover, the ability of feedback system 800 to monitor and collect various types of feedback system fluid data on an ongoing basis permits feedback system 800 to interact with control system 900 and respond in a desired manner to various predefined feedback system fluid conditions, such as by facilitating the implementation of appropriate corresponding actions, disclosed elsewhere herein, concerning fluid system 1000. By way of example, embodiments of feedback system 800 can be configured to monitor the feedback system fluid for the presence or occurrence of various conditions such as, but not limited to, a predetermined rate of pressure drop, a pressure drop of predetermined magnitude, and the occurrence of any change in pressure.

Similar to the case of other exemplary embodiments disclosed herein, the data collected by feedback system 800 through the use of thermometer 816 and pressure gauge 818 may be stored in memory 810, presented on display 812, and/or processed in various ways by processor 808. As discussed herein, processor 808 serves to calculate, among other things, pressure differentials and changes in pressure with respect to time, or any other parameters that can be derived from known and/or measured data and information.

As noted elsewhere herein, a flow of feedback system fluid usually indicates that the integrity of the associated joint has been compromised in some way, or that the joint was improperly formed in the first instance. In the event such a compromise occurs, the line fluid present in fluid passage 201 (see, e.g., FIGS. 9A and 9B) of dry break valve assembly 200, for example, will in many cases tend to flow into chamber 813 at substantially the same rate at which the feedback system fluid flows out of chamber 813. Thus, the leak rate of the line fluid can be closely approximated, in real time, by determining the mass flow rate m of the feedback system fluid which, as discussed above, can be readily performed with various embodiments of the invention.

The ability to determine, in real time and on a continual basis, the leak rate, if any, of the line fluid is useful in a number of applications. By way of example, in some hydrocarbon processing evolutions, specific parts per million (ppm) figures for permissible line fluid discharge have been established by various regulatory bodies, and failure of the processing plant operator to conform with such standards may result in substantial fines and/or plant shutdown. Thus, this exemplary embodiment of feedback system 800 serves not only to provide feedback to the processing plant operator concerning joint integrity, and to facilitate implementation of corresponding remedial actions if required, but also to enhance the ability of the processing plant operator to verify and maintain compliance with relevant operational standards through the monitoring and determination of line fluid leak rates. Note that in at least one embodiment, flow switch 804A (FIG. 8A) may be configured to generate an alarm signal in the event the line fluid leak rate exceeds a predetermined value. Further, feedback system 800 may be readily reconfigured or adjusted as required for consistency with changes in permissible discharge ppm, or other, standards.

In the exemplary embodiment of feedback system 800 illustrated in FIG. 11, mass flow rates m of the feedback system fluid are derived at least in part through the use of feedback system fluid pressure data supplied by a pressure gauge or similar device. However, it may be desirable in some cases to measure such mass flow rates m directly. Various features of an exemplary embodiment of a feedback system 800 configured in this way are illustrated in FIG. 12.

As indicated in FIG. 12, the illustrated embodiment of feedback system 800 includes a flow meter 820, in fluid communication with sensor line 806, that permits direct measurement of mass flow rates m. Further, flow meter 820 is in electronic communication with processor 808 so that signals generated and transmitted by flow meter 820 can be received and processed by processor 808 generally as disclosed elsewhere herein. In some cases, processor 808 causes the storage, manipulation, and/or display of data received by processor 808 from flow meter 820. As another example, processor 808 may use data received from flow meter 820 to facilitate the implementation of various actions, such as by way of various equipment controllers, concerning the fluid system 1000 in conjunction with which feedback system 800 is employed.

The specific type, and/or operational characteristics, of flow meter 820 employed in a given application may be selected depending on upon various factors, such as whether the feedback system fluid comprises a gas or a liquid. Exemplary types of flow meters that may be employed include, but are not limited to, thermal mass flow meters, and induction-based flow meters. In general however, any type of flow meter or other device useful in implementing the functionality disclosed herein may be employed, and the scope of the present invention should not be construed to be limited to any particular type of flow meter.

Further, the operational characteristics of the flow meter may likewise be selected and/or adjusted based upon particular application requirements. By way of example, the flow meter may be configured to store a predetermined number of real time data points that can be transmitted to a processor such as processor 808, for example. Further, the flow meter may be configured to measure, in addition to flow rate at a particular point in time, the total volume of flow that has occurred through the flow meter over a given period of time. Moreover, the flow meter can be set to generate an alarm or other signal under various specified conditions concerning the feedback system fluid and/or line fluid wherein such conditions include, but are not limited to, passage of a predetermined volume of flow, passage of a predetermined volume of flow over a defined time interval, or upon the occurrence of any flow.

As suggested by the discussion herein concerning the determination of mass flow rates m, and various other characteristics, of the feedback system fluid, various approaches may be utilized in making such determinations. In particular, a computational approach, as exemplified by the use of pressure data, and gas dynamics conservation of mass principles and equations, examples of which are disclosed herein, may be desirable in some cases. In other cases however, an empirical approach may be desirable. In at least one embodiment disclosed herein, such an empirical approach is exemplified by the use of devices and instruments such as flow meters to directly measure the mass flow rate m of the feedback system fluid. In view of the foregoing, the scope of the invention should not be construed to be limited solely to a particular computational or empirical technique, or to a particular type of technique. Rather, any technique or approach, or combination thereof, useful in implementing the functionality disclosed herein may be employed.

It should be noted that equipment and devices such as the pressure gauge 818 and flow meter 820 disclosed herein are but exemplary structures that function as a means for producing line fluid leakage rate data. As disclosed herein, such means for producing line fluid leakage rate data serve to, among other things, measure a line fluid leakage rate directly, as in the case of flow meter 820, or generate data, such as feedback system fluid pressure data for example, that can be used to derive the line fluid leakage rate, as in the case of pressure gauge 818. Accordingly, it should be understood that such structural configurations are presented herein solely by way of example and should not be construed as limiting the scope of the present invention in any way. Rather, any other structure or device that is effective in implementing the functionality disclosed herein may alternatively be employed.

The described embodiments are to be considered in all respects only as exemplary and not restrictive. The scope of the invention is, therefore, indicated by the appended claims rather than by the foregoing description. All changes which come within the meaning and range of equivalency of the claims are to be embraced within their scope.

What is claimed is:

1. A fluid system apparatus suitable for use in conjunction with a fluid system, comprising:

(a) a valve assembly disposed between a fluid source and a fluid destination for facilitating a transfer of fluid between the fluid source and the fluid destination such that leakage of the fluid is minimized when the valve assembly is disassembled, the valve assembly comprising:

(i) a housing including a source housing and a destination housing, wherein a coupler releasably engages the source housing with the destination housing;

(ii) a source flow control assembly including a source resilient member disposed within the source housing, wherein the source flow control assembly controls the transfer of the fluid through the source housing;

(iii) a destination flow control assembly including a destination resilient member disposed within the destination housing, wherein the destination flow control assembly controls the transfer of the fluid through the, destination housing;

(iv) an actuating lever operably connected with the housing;

(v) an actuating mechanism operably connected with the actuating lever, wherein the actuating mechanism includes a driver and at least one displacement shaft, the at least one displacement shaft connected with the source flow control assembly, wherein the driver and the at least one displacement shaft cause the destination flow control assembly and the source flow control assembly to open at substantially the same time when the actuating lever is rotated, and wherein the source flow control assembly and the destination flow control assembly close when the source housing separates from the destination housing, said actuating mechanism configured to lock in an overextended position when fully actuated; and (b) a feedback system including:

(i) means for exerting a predetermined pressure on at least a passage;

(ii) means for sensing fluid flow, said means for sensing fluid flow in at least indirect communication with said means for exerting a predetermined pressure; and (iii) a processor in operative communication with said means for sensing fluid flow.

2. The fluid system apparatus as recited in claim 1, wherein said means for sensing fluid flow is configured to detect changes in said predetermined pressure.

3. The fluid system apparatus as recited in claim 1, wherein said means for sensing fluid flow generates a signal corresponding to a change from said predetermined pressure.

4. The fluid system apparatus as recited in claim 1, wherein said means for sensing fluid flow is selected from the group consisting of: a pressure transducer, a flow switch, and a differential pressure gauge.

5. The fluid system apparatus as recited in claim 1, wherein said means for exerting a predetermined pressure comprises a feedback system fluid source that provides a volume of feedback fluid and is configured for fluid communication with said passage by way of a sensor line.

6. The fluid system apparatus as recited in claim 1, wherein said means for exerting a predetermined pressure is selected from the group consisting of: vacuum devices, compressors, and pumps.

7. The fluid system apparatus as recited in claim 1, wherein said means for exerting a predetermined pressure facilitates maintenance of said predetermined pressure in said passage.

8. The fluid system apparatus as recited in claim 1, wherein said feedback system further includes a means for producing line fluid leakage rate data concerning the fluid system.

9. A fluid system apparatus suitable for use in conjunction with a fluid system, comprising:

(a) a valve assembly suitable for use in managing fluid flow, the valve assembly comprising:

first and second housing portions configured to be releasably joined together by a coupling, the first and second housing portions collectively defining at least one fluid flow passage and a joint when joined together;

first and second flow control assemblies disposed within the first and second housing portions, respectively;

an actuating mechanism configured to automatically lock in an overextended position substantially disposed in the at least one fluid flow passage, and the actuating mechanism comprising:

a cam mechanism;

at least one displacement shaft connected to the cam mechanism, the at least one displacement shaft being operably connected with the first flow control assembly;

a driver connected to the cam mechanism, the driver being arranged for operational contact with the second flow control assembly; and an actuating lever operably connected with the cam mechanism; and (b) means for monitoring integrity of said joint defined by said first and second housing portions when said first and second housing portions are joined together.

10. The fluid system apparatus as recited in claim 9, wherein said means for monitoring integrity of said joint exerts a predetermined pressure.

11. The fluid system apparatus as recited in claim 10, wherein said means for monitoring integrity of said joint generates a signal corresponding to a status of said predetermined pressure.

12. The fluid system apparatus as recited in claim 10, wherein said means for monitoring integrity of said joint generates a signal when said predetermined pressure changes to a specified magnitude.

13. The fluid system apparatus as recited in claim 10, wherein said means for monitoring integrity of said joint determines a line fluid leakage rate from the fluid system.

14. The fluid system apparatus as recited in claim 13, wherein said line fluid leakage rate is determined substantially in real time.

15. The fluid system apparatus as recited in claim 10, wherein said predetermined pressure is positive with respect to atmospheric pressure.

16. The fluid system apparatus as recited in claim 10, wherein said predetermined pressure is negative with respect to atmospheric pressure.

17. The fluid system apparatus as recited in claim 10, wherein said means for monitoring integrity of said joint comprises a feedback system, said feedback system comprising:

(a) a feedback system fluid source that provides a volume of feedback fluid and is configured for fluid communication with said joint by way of a sensor line;

(b) means for sensing fluid flow, said means for sensing fluid flow in at least indirect communication with said feedback system fluid source; and (c) a processor in operative communication with said means for sensing fluid flow.

18. The fluid system apparatus as recited in claim 15, wherein said means for sensing fluid flow is selected from the group consisting of: a pressure transducer, a flow switch, and a differential pressure gauge.

19. A fluid system apparatus suitable for use in conjunction with a fluid system, comprising:

(a) a dry break valve assembly, comprising:

first and second housing portions configured to be releasably joined together, the first and second housing portions collectively defining at least one fluid flow passage and a joint when joined together;

first and second flow control assemblies disposed within the first and second housing portions, respectively, said first and second flow control assemblies each further comprising a valve gate biased into a predetermined position by a corresponding resilient member;

an actuating mechanism operably connected with the first and second flow control assemblies and substantially disposed in the at least one fluid flow passage; means for automatically locking said actuating mechanism in an overextended position upon full engagement of said actuating mechanism; and an actuating lever operably connected with the actuating mechanism; and (b) means for monitoring integrity of said joint formed by said first and second housing portions.

20. The fluid flow management system as recited in claim 19, wherein said means for monitoring integrity of said joint exerts a predetermined pressure.

21. The fluid flow management system as recited in claim 20, wherein said means for monitoring integrity of said joint generates a signal corresponding to a status of said predetermined pressure.

22. The fluid flow management system as recited in claim 20, wherein said means for monitoring integrity of said joint generates a signal when said predetermined pressure changes to a specified magnitude.

23. The fluid system apparatus as recited in claim 20, wherein said means for monitoring integrity of said joint determines a line fluid leakage rate from the fluid system.

24. The fluid flow management system as recited in claim 19, wherein said means for monitoring integrity of said joint comprises a feedback system, said feedback system comprising:

(a) a feedback system fluid source that provides a volume of feedback fluid and is configured for fluid communication with said joint by way of a sensor line;

(b) means for sensing fluid flow, said means for sensing fluid flow in at least indirect communication with said feedback system fluid source; and (c) a processor in operative communication with said means for sensing fluid flow.

25. A fluid system apparatus suitable for use in conjunction with a fluid system, comprising:

(a) a valve assembly suitable for use in managing fluid flow, the valve assembly comprising:

first and second housing portions configured to be releasably joined together by a coupling, the first and second housing portions collectively defining at least one fluid flow passage when joined together;

first and second flow control assemblies disposed within the first and second housing portions, respectively;

an actuating mechanism configured to automatically lock in an overextended position and operably connected with the first and second flow control assemblies and substantially disposed in the at least one fluid flow passage; and an actuating lever operably connected with the actuating mechanism, wherein the actuating mechanism causes the first and second flow control assemblies to automatically assume a closed position upon removal of the coupling;

(b) means for exerting a predetermined pressure in said joint;

(c) means for sensing fluid flow, said means for sensing fluid flow being in at least indirect communication with said means for exerting a predetermined pressure; and (d) a processor in communication with said means for sensing fluid flow.

26. The fluid system apparatus as recited in claim 25, further comprising a means for producing line fluid leakage rate data concerning the device.

27. The fluid system apparatus as recited in claim 25, wherein said means for exerting a predetermined pressure is selected from the group consisting of: vacuum devices, compressors, and pumps.

28. The fluid system apparatus as recited in claim 25, wherein said means for sensing fluid flow is configured to detect changes in said predetermined pressure.

29. The fluid system apparatus as recited in claim 25, wherein said means for sensing fluid flow generates a signal corresponding to a status of said predetermined pressure.

30. The fluid system apparatus as recited in claim 25, wherein said means for sensing fluid flow generates a signal in the event of a change in said predetermined pressure.

31. The fluid system apparatus as recited in claim 25, wherein said means for sensing fluid flow is selected from the group consisting of: a pressure transducer, a flow switch, and a differential pressure gauge.

32. The fluid system apparatus as recited in claim 25, wherein said means for exerting a predetermined pressure facilitates maintenance of said predetermined pressure.

33. A fluid system apparatus suitable for use in conjunction with a fluid system, the fluid system apparatus comprising:

(a) a valve assembly for use in managing flow between a fluid source and a fluid destination, the valve assembly comprising:

a source housing having a source flow control assembly substantially disposed within the source housing;

a destination housing having a destination flow control assembly substantially disposed within the destination housing;

means for releasably joining the source housing and the destination housing, the first and second housing portions collectively defining at least one fluid flow passage when joined together; and means for activating an actuating mechanism, wherein the activating of the actuating mechanism at least indirectly causes the actuating mechanism to displace at substantially the same time the source flow control assembly and the destination flow control assembly in an open position, establishing fluid communication between the fluid source and the fluid destination; and means for automatically locking said actuating mechanism in an overextended position upon full engagement of said actuating mechanism; and (b) a feedback system fluid source that provides a volume of feedback fluid and is configured for fluid communication with said means for releasably joining by way of a sensor line;

(c) a means for producing line fluid leakage rate data; and (d) a processor in communication with said means for producing line fluid leakage rate data.

34. The fluid system apparatus as recited in claim 33, wherein said means for producing line fluid leakage rate data either measures said line fluid leakage rate directly or gathers data that can be used to derive said line fluid leakage rate.

35. The fluid system apparatus as recited in claim 33, wherein said means for producing line fluid leakage rate data gathers pressure data concerning said feedback fluid.

36. The fluid system apparatus as recited in claim 33, wherein said means for producing line fluid leakage rate data gathers pressure data concerning said feedback fluid on an intermittent basis.

37. The fluid system apparatus as recited in claim 33, wherein said means for producing line fluid leakage rate data gathers pressure data concerning said feedback fluid on substantially continuous basis.

38. The fluid system apparatus as recited in claim 33, wherein said means for producing line fluid leakage rate data cooperates with said processor to generate line fluid leakage rates in substantially real time.

39. The fluid system apparatus as recited in claim 33, wherein said means for producing line fluid leakage rate data comprises one of: a flow meter in fluid communication with said sensor line and said processor; and a pressure gauge in fluid communication with said sensor line and said processor.

40. A fluid management and control system, comprising:

(a) a valve assembly suitable for use in managing fluid flow, the valve assembly comprising:

(i) first and second housing portions configured to be releasably joined together by a coupling, the first and second housing portions collectively defining at least one fluid flow passage when joined together;

(ii) first and second flow control assemblies disposed within the first and second housing portions, respectively;

(iii) an actuating mechanism configured to automatically lock in an overextended position and operably connected with the first and second flow control assemblies and substantially disposed in the at least one fluid flow passage; and (iv) an actuating lever operably connected with the actuating mechanism, wherein at least one of the first and second flow control assemblies exerts a retention force on the actuating mechanism when the first and second flow control assemblies are in an open position; and (b) a feedback system, comprising:

(i) a feedback system fluid source that provides a volume of feedback fluid and is configured for fluid communication with said coupling by way of a sensor line;

(ii) means for sensing fluid flow, said means for sensing fluid flow in at least indirect communication with said feedback system fluid source; and (iii) a processor in operative communication with said means for sensing fluid flow; and (c) a control system in operative communication with said processor and comprising at least one piece of equipment in operative communication with an equipment controller.

41. The fluid management and control system as recited in claim 40, further comprising a means for producing line fluid leakage rate data concerning said fluid system component.

42. The fluid management and control system as recited in claim 40, wherein said means for producing line fluid leakage rate data comprises one of: a flow meter in fluid communication with said sensor line and said processor; and a pressure gauge in fluid communication with said sensor line and said processor.

43. The fluid management and control system as recited in claim 40, wherein said means for sensing fluid flow is selected from the group consisting of: a pressure transducer, a flow switch, and a differential pressure gauge.

44. The fluid management and control system as recited in claim 40, wherein said means for producing line fluid leakage rate data either measures said line fluid leakage rate directly or gathers data that can be used to derive said line fluid leakage rate.

45. The fluid management and control system as recited in claim 40, wherein said means for exerting a predetermined pressure is selected from the group consisting of: vacuum devices, compressors, and pumps.

* * * * *